(12) United States Patent
Yoneda

(10) Patent No.: US 11,070,491 B2
(45) Date of Patent: Jul. 20, 2021

(54) CONTROL SYSTEM AND COMMUNICATION METHOD

(71) Applicant: OMRON Corporation, Kyoto (JP)

(72) Inventor: Mitsuhiro Yoneda, Tenri (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/639,552

(22) PCT Filed: Aug. 23, 2018

(86) PCT No.: PCT/JP2018/031070
§ 371 (c)(1),
(2) Date: Feb. 14, 2020

(87) PCT Pub. No.: WO2019/065015
PCT Pub. Date: Apr. 4, 2019

(65) Prior Publication Data
US 2020/0244594 A1 Jul. 30, 2020

(30) Foreign Application Priority Data
Sep. 27, 2017 (JP) .............................. JP2017-186932

(51) Int. Cl.
*H04L 12/911* (2013.01)
*G05B 19/418* (2006.01)
*H04L 29/08* (2006.01)

(52) U.S. Cl.
CPC .......... *H04L 47/82* (2013.01); *G05B 19/4186* (2013.01); *H04L 67/12* (2013.01);
(Continued)

(58) Field of Classification Search
CPC ......... H04L 47/82; H04L 67/12; H04L 47/28; H04L 2012/4026; H04L 12/407;
(Continued)

(56) References Cited

U.S. PATENT DOCUMENTS

| 7,969,985 B1 * | 6/2011 | Cline .................. H04L 12/4035 |
| | | 370/394 |
| 9,819,733 B2 * | 11/2017 | Gordon ............... H04L 67/1074 |

(Continued)

FOREIGN PATENT DOCUMENTS

| CN | 102484607 | 10/2014 |
| CN | 104126155 | 10/2014 |

(Continued)

OTHER PUBLICATIONS

"International Search Report (Form PCT/ISA/210) of PCT/JP2018/031070," dated Nov. 6, 2018, with English translation thereof, pp. 1-4.

(Continued)

*Primary Examiner* — Joe Chacko
(74) *Attorney, Agent, or Firm* — JCIPRNET

(57) ABSTRACT

A first control device connected to a network in which data is updated at every predetermined cycle transmits, at every predetermined cycle, first data used for controlling a manufacturing device or a production facility, using a first communication band among communication bands possessed by the network. A second control device connected to the network and time-synchronized with the first control device transmits second data used for setting and managing the manufacturing device or the production facility, using a second communication band other than the first communication band among the communication bands possessed by the network.

7 Claims, 16 Drawing Sheets

(52) U.S. Cl.
CPC .......... *G05B 2219/31145* (2013.01); *G05B 2219/33183* (2013.01)

(58) Field of Classification Search
CPC .......... H04L 12/28; G05B 19/4186; G05B 2219/31145; G05B 2219/33183; G05B 19/418
See application file for complete search history.

(56) References Cited

U.S. PATENT DOCUMENTS

| 2012/0057479 | A1 | 3/2012 | Maruyama et al. | |
| 2015/0058432 | A1* | 2/2015 | Mizutani | G05B 19/0423 709/208 |
| 2018/0287666 | A1* | 10/2018 | Kornek-Percin | H04B 3/542 |

FOREIGN PATENT DOCUMENTS

| CN | 107113246 | 8/2017 |
| EP | 2485436 | 8/2012 |
| EP | 3528448 | 8/2019 |
| JP | 2006005646 | 1/2006 |
| JP | 2012060207 | 3/2012 |
| JP | 2017120618 | 7/2017 |
| WO | 2016129205 | 8/2016 |

OTHER PUBLICATIONS

"Written Opinion of the International Searching Authority (Form PCT/ISA/237) of PCT/JP2018/031070," dated Nov. 6, 2018, with English translation thereof, pp. 1-6.
Shinichi Motoyoshi, "SCF 2005/INCHEM Tokyo 2005/Maintenance-Techno Show 2005 Special event, The movement of industrial ethernet," Instrumentation Control Engineering, vol. 48, Dec. 2005, pp. 1-6.
"Search Report of Europe Counterpart Application", dated Feb. 15, 2021, p. 1-p. 10.
Seung Ho Hong, "Bandwidth Allocation Scheme for Cyclic-Service Fieldbus Networks," IEEE/ASME Transactions on Mechatronics, vol. 6, Jun. 2001, pp. 197-204.
"Office Action of China Counterpart Application", dated Apr. 28, 2021, with English translation thereof, p. 1-p. 12.
"Office Action of Japan Counterpart Application", dated Feb. 24, 2021, with English translation thereof, p. 1-p. 7.
Koichi Yoshinichi, "SCF 2005/INCHEM Tokyo 2005 Maintenance Techno show 2005 Special Layout," Instrumentation (and) Industrial technology, vol. 48, Dec. 1, 2005, pp. 1-6.

* cited by examiner

| | (1) control system data | (2) control information system data | (3) information system data |
|---|---|---|---|
| gist | data for actually controlling equipment | data related to setting and management of equipment (data indicating state of equipment) | data utilized in host management system |
| example | · servo command value/encoder value<br>· sensor ON/OFF value | · sensor threshold value<br>· abnormality information (log)<br>· firmware<br>· statistical data (requiring punctuality) | · statistical data (not requiring punctuality)<br>· monitoring image data |
| communication cycle example | ≦10msec | <100msec | best effort |
| data size | fixed and small | Diverse (typically, below kbyte order) | Diverse (typically, larger than control information system data) | integrated on single network

FIG.2

CONTROL SYSTEM AND COMMUNICATION METHOD

CROSS-REFERENCE TO RELATED APPLICATION

This application is a 371 application of the International PCT application serial no. PCT/JP2018/031070, filed on Aug. 23, 2018, which claims the priority benefits of Japan Patent Application No. 2017-186932, filed on Sep. 27, 2017. The entirety of each of the above-mentioned patent applications is hereby incorporated by reference herein and made a part of this specification.

BACKGROUND OF THE INVENTION

Technical Field

The present invention relates to a control system which controls a manufacturing device or a production facility and a communication method in the control system

Related Art

Along with the advancement of information and communication technology (ICT: Information and Communication Technology) in recent years, a control system that makes equipment from an on-site manufacturing equipment to a host management device into an integrated network is also being implemented for a production line.

For example, in Japanese Patent Laid-Open No. 2017-120618 (patent literature 1), a system is disclosed which includes at least one machine, at least one machine control device that controls the machine, a cell control device communicably connected to the machine control device, and a host computer communicably connected to the cell control device. In patent literature 1, the cell control device and the machine control device are connected via a network such as an intranet or the like, and the host computer is connected to the cell control device via a network such as the Internet or the like. The cell control device sends a command to the machine control device and acquires data (including preventive maintenance data) indicating an operation state of the machine from the machine control device. The cell control device further notifies a host controller of a grace time until machine parts reach the end of life, the grace time being calculated based on the preventive maintenance data received from the machine control device. The host controller creates or updates a maintenance plan including replacement work of the machine parts based on the received grace time.

LITERATURE OF RELATED ART

Patent Literature

Patent literature 1: Japanese Patent Laid-Open No. 2017-120618

SUMMARY

Problems to be Solved

As described above, in the conventional control system, since the host management device is responsible for preventive maintenance of the manufacturing device or the production facility, the control device (typically, PLC (programmable controller) that controls the manufacturing device or the production facility should transmit data (information system data) handled by the host management device in addition to data (control system data) used for controlling the manufacturing device, the production facility, or the like. In general, the control system data is required to be real-time although the data size thereof is not so large. On the contrary, the information system data should be transmitted with a relatively large size although real-time is not necessary. Therefore, a processing load is concentrated on the control device.

However, in the control device, in order to control the manufacturing device or the production facility at a high speed and with high precision, the processing load of the control system data cannot be reduced. Therefore, the amount of the information system data that can be transmitted by the control device should be limited, and as a result, the data amount of the information system data that can be handled by the host management device is limited. When the data amount of the information system data is limited as described above, there is a concern that the precision of predictive management for preventing the occurrence of an abnormality in the host management device is reduced.

Accordingly, in a control system for controlling a manufacturing device or a production facility, a new technology is required for transmitting control system data and information system data on the same network while satisfying each requirement.

Means to Solve Problems

In an example of the disclosure, a control system which controls a manufacturing device or a production facility includes: a first control device connected to a network in which data is updated at every predetermined cycle, and a second control device connected to the network and time-synchronized with the first control device. The first control device transmits, at every predetermined cycle, first data used for controlling the manufacturing device or the production facility, using a first communication band among communication bands possessed by the network. The second control device transmits second data used for setting and managing the manufacturing device or the production facility, using a second communication band other than the first communication band among the communication bands possessed by the network.

According to the control system of the disclosure, the communication band necessary for transmitting the first data (control system data) at every predetermined cycle and the communication band necessary for transmitting the second data (control information system data) are respectively assigned to the first control device and the second control device that are time-synchronized with each other. Thereby, it is possible to transmit the first data and the second data on the same network while satisfying each requirement without increasing the processing load of each of the first control device and the second control device. As a result, in the control system for controlling a manufacturing device or a production facility, information necessary for managing the manufacturing device or the production facility can be collected with high time precision while the manufacturing device or the production facility is controlled at a high speed and with high precision, and thus the predictive management of the manufacturing device or the production facility can be performed with high precision. For example, the precision of failure prediction of the manufacturing device or the production facility can be improved, and thus high efficiency in troubleshooting can be achieved.

Preferably, the first control device cyclically transmits the first data using the first communication band, and transmits the second data using a part of the second communication band. The second control device transmits the second data using a communication band other than the part of the second communication band.

Accordingly, by sharing the communication band necessary for transmitting the second data between the first control device and the second control device, the second data can be transmitted without increasing the processing load of each control device.

Preferably, the second control device further transmits third data using a communication band that is not set in either the first communication band or the second communication band among the communication bands possessed by the network.

Accordingly, it is possible to transmit the first data (control system data), the second data (control information system data), and the third data (information system data) on the same network while satisfying each requirement, without increasing the processing load of each of the first control device and the second control device.

Preferably, the second control device divides the second data into data sizes corresponding to communication bands available at every cycle, and then assigns the divided data to a plurality of cycles.

Accordingly, it is possible to guarantee that the first data (control system data) is updated at every predetermined cycle and transmit the second data (control information system data).

Preferably, the control system further includes a third control device connected to the network and time-synchronized with the first and second control devices. The third control device transmits the third data using a communication band that is not set in either the first communication band or the second communication band among the communication bands possessed by the network.

Accordingly, it is possible to transmit the first data (control system data), the second Data (control information system data), and the third data (information system data) on the same network while satisfying each requirement, without increasing the processing load of each of the first control device, the second control device, and the third control device.

According to an example of the disclosure, a communication method in a control system which controls a manufacturing device or a production facility is provided. The control system includes a first control device connected to a network in which data is updated at every predetermined cycle, and a second control device connected to the network and time-synchronized with the first control device. The communication method includes: a step in which the first control device transmits, at every predetermined cycle, first data used for controlling the manufacturing device or the production facility, using a first communication band of communication bands possessed by the network; and a step in which the second control device transmits second data used for setting and managing the manufacturing device or the production facility, using a second communication band other than the first communication band among the communication bands possessed by the network.

According to the communication method of the disclosure, it is possible to transmit the first data (control system data) and the second data (control information system data) on the same network while satisfying each requirement, without increasing the processing load of each of the first control device and the second control device constituting the control system.

Preferably, the communication method further includes a step in which the second control device transmits third data using a communication band that is not set in either the first communication band or the second communication band among the communication bands possessed by the network.

Accordingly, it is possible to transmit the first data (control system data), the second data (control information system data), and the third data (information system data) on the same network while satisfying each requirement, without increasing the processing load of each of the first and second control devices.

Preferably, the control system further includes a third control device connected to the network and time-synchronized with the first control device and the second control device. The communication method further include a step in which the third control device transmits third data using a communication band that is not set in either the first communication band or the second communication band among the communication bands possessed by the network.

Accordingly, it is possible to transmit the first data (control system data), the second data (control information system data), and the third data (information system data) on the same network while satisfying each requirement, without increasing the processing load of each of the first control device, the second control device, and the third control device.

Effect

According to an example of the disclosure, in the control system for controlling the manufacturing device or the production facility, it is possible to transmit the control system data and the information system data on the same network while satisfying each requirement.

BRIEF DESCRIPTION OF THE DRAWINGS

FIG. 2 is a diagram showing data types transmitted in the control system shown in FIG. 1.

DESCRIPTION OF THE EMBODIMENTS

§ 1 APPLICATION EXAMPLE

Figure 1:
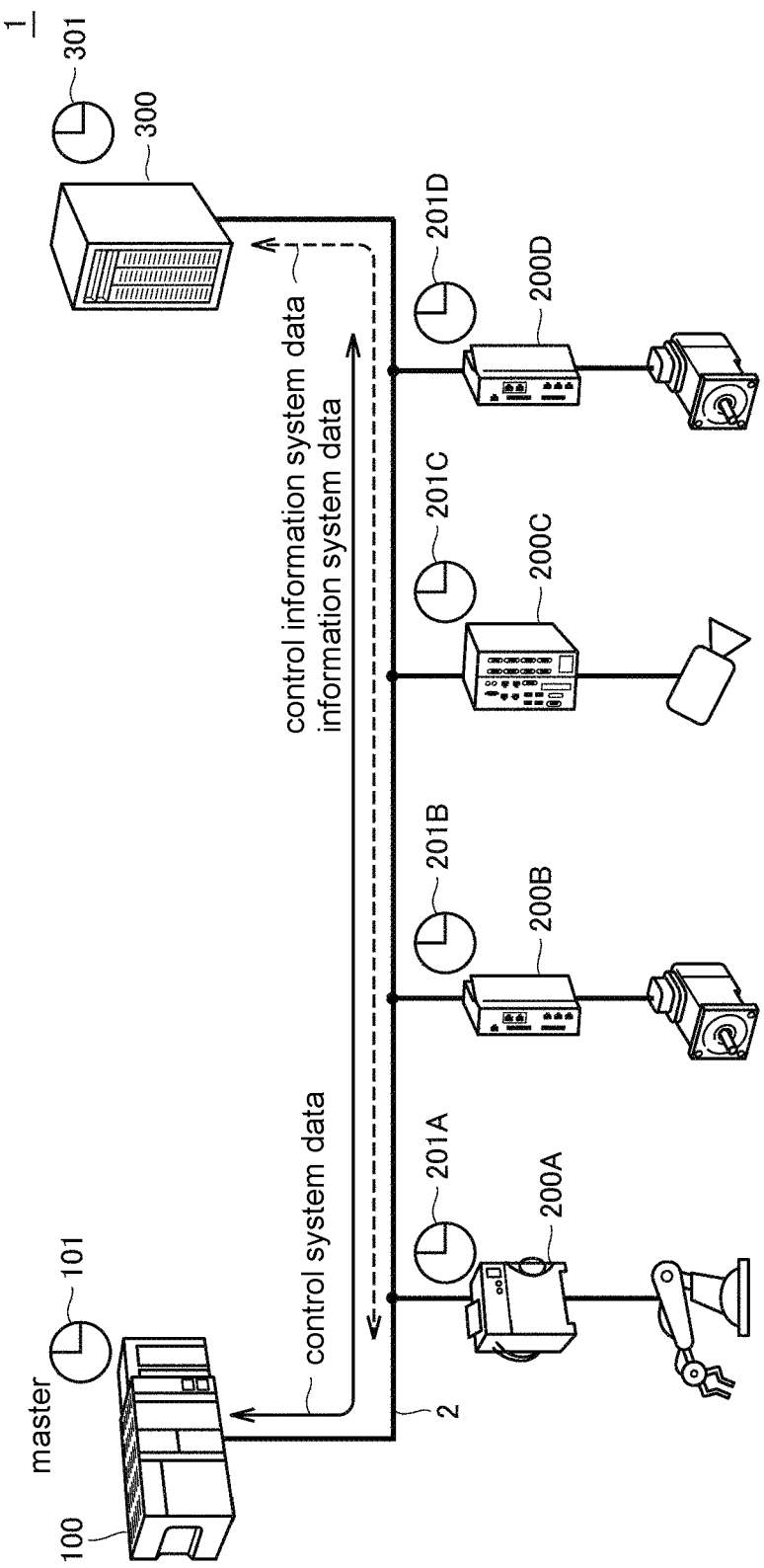
FIG. 1 is a schematic diagram showing a control system centering on control devices 100 and 300 of the embodiment.

First, FIG. 1 is used to describe an example of a scene to which the present invention is applied. FIG. 1 schematically illustrates an example of an application scene of a control system 1 of the embodiment. The control system 1 of the embodiment is a control system that controls a manufacturing device or a production facility.

Referring to FIG. 1, the control system 1 includes a control device 100 and a control device 300 which are connected to a network 2 in which data is updated at every predetermined cycle. In the example of FIG. 1, the control device 100 is embodied by a PLC, and the control device 300 is embodied by an IPC (industrial controller). The control device 100 corresponds to one example of a "first control device" of the present invention, and the control device 300 corresponds to one example of a "second control device" of the present invention.

The control device 100 exchanges data (control system data) used for controlling a manufacturing device or a production facility with one or more field equipment 200A-200D via the network 2. That is, the control device 100 corresponds to a "control system controller" responsible for control system communication. On the other hand, the control device 300 transmits, for example, data (control information system data) related to equipment setting and management, which does not require to have high-speed real-time performance as control system data but requires a certain degree of punctuality, and/or data used in a host management device (information system data), on the network 2. That is, the control device 300 corresponds to a "control information system controller" responsible for control information system communication (including information system communication).

The control device 100 (control system controller), the control device 300 (control information system controller), and the field equipment 200A-200D are time-synchronized with each other. In a communication method of the embodiment, a communication band necessary for updating control system data at every predetermined cycle and a communication band necessary for transmitting control information system data and information system data are respectively assigned to the control device 100 and the control device 300. Thereby, it is possible to transmit the control system data, the control information system data, and the information system data on the same network while satisfying each requirement, without increasing the processing load of each of the control devices 100 and 300.

Besides, the control device 100 can be responsible for not only transmission of the control system data but also transmission of the control information system data and the information system data. In this case, the transmission of the control information system data and the information system data are shared by the control device 100 and the control device 300.

According to the communication method of the embodiment, in the control system 1 that controls the manufacturing device or the production facility, the manufacturing device or the production facility can be controlled at a high speed and with high precision, and information necessary for management of the manufacturing device or the production facility can be collected with high time precision, and thus predictive management of the manufacturing device or the production facility can be performed with high precision. Specifically, the precision of failure prediction of the manufacturing device or the production facility can be improved, and thus high efficiency in troubleshooting can be achieved.

§ 2 Configuration Example

Embodiments of the present invention are described in detail with reference to the drawings. Besides, the same or corresponding parts in the drawings are denoted by the same reference signs, and the description thereof is not repeated.

A. Overall Configuration Example of Control System

First, an overall configuration of the control system 1 of the embodiment is described. FIG. 1 is a schematic diagram showing the control system 1 centering on the control devices 100 and 300 of the embodiment.

The control device 100 corresponds to an industrial controller that controls an object to be controlled such as various types of facilities or devices. The control device 100 is a type of computer that executes control computation, and may be typically embodied as a PLC (programmable controller). Various field equipment such as a sensors and an actuator are connected to the control device 100. These field equipment may be directly connected via an input/output unit attached to the control device 100, and may also be connected via a field network.

In the configuration example shown in FIG. 1, in the control device 100, a field network 2 is configured, and a plurality of field equipment 200A-200D (hereinafter, also collectively referred to as "field equipment 200") is connected to the field network 2. Each of the plurality of field equipment 200A-200D includes an input device that acquires a field signal, and an output device or an actuator that performs some action on the field according to a command from the control device 100. The field network 2 is provided to have main functions of input and device control. In general, the "field network" is also referred to as "field bus", but for the sake of simplicity of description, in the following description, the "field network" is a concept that can contain the "field bus" in addition to the "field network" in a narrow sense.

The control computation executed in the control device 100 includes processing (input processing) for collecting data (hereinafter also referred to as "input data") collected or generated in the field equipment 200, processing (computation processing) for generating data (hereinafter also referred to as "output data") such as commands to the field equipment 200, processing (output processing) for transmitting the generated output data to the target field equipment 200, and the like.

An arbitrary field equipment 200 can be connected to the field network 2. The field equipment 200 includes an actuator that gives some physical action to a manufacturing device, a production line or the like (hereinafter also referred to as "field"), an input/output device that exchanges information with the field, and the like.

Data is exchanged between the control device 100 and the field equipment 200 via the field network 2, and the exchanged data is updated at a very short cycle of several hundreds of microseconds to tens of milliseconds. Besides, this update processing of the exchanged data is also referred to as input/output refresh processing.

Furthermore, the control device 300 is connected to the field network 2. The control device 300 corresponds to a management equipment that acquires information from the facility or the device being the object to be controlled to monitor and manage the object to be controlled. The control device 300 is a type of computer that acquires information from the facility or the device being the object to be controlled to perform macroscopic or microscopic analysis or the like, and may be typically embodied as an IPC (industrial computer).

In a general control system, a management device such as the control device 300 is configured to be connected to the control device 100 via a host network of the field network 2, and to exchange data with the control device 100. On the contrary, in the control system 1 of the embodiment, the control device 300 is connected to the field network 2 and thus can acquire data directly from the field equipment 200.

B. Required Communication Performance

In the field network 2 shown in FIG. 1, basically, data for actually controlling the equipment (hereinafter, also collectively referred to as "control system data") is cyclically transmitted, and data that is required by devices included in the host network and that is used for monitoring, managing, and controlling production activities or the like of a production line/factory or the like (hereinafter, also collectively referred to as "information system data") needs to be transmitted.

Furthermore, data such as the control system data which does not require high-speed real-time performance but requires a certain degree of punctuality (for example, the data related to equipment setting and management) is also present. Hereinafter, for convenience of description, the data is also referred to as "control information system data".

FIG. 2 is a diagram showing data types transmitted in the control system 1 shown in FIG. 1. Referring to FIG. 2, in the control system 1, (1) control system data, (2) control information system data, and (3) information system data are mainly transmitted. Besides, transmission of the data not classified into any of the above types is not excluded, and other types of data may be further transmitted.

The (1) control system data includes data for actually controlling the equipment as a gist thereof. That is, the control system data corresponds to data used for controlling the manufacturing device or the production facility. Examples of the control system data include servo command values, encoder values, sensor ON/OFF values, and the like.

Basically, the control system data is transmitted cyclically. The communication cycle for this control system is preferably set to 10 msec or less. Then, it is necessary to reliably guarantee this communication cycle. On the other hand, since the content of the control system data transmitted on the network is set in advance, the data size is fixed and relatively small.

The (2) control information system data is the data classified into information necessary for control among the data used in information system communication, and includes data related to equipment setting and management as a gist thereof. That is, the control information system data corresponds to data that needs to arrive at the destination at a specified time. Accordingly, the high-speed real-time performance of the control system data is not required, but a certain degree of punctuality is required. The data related to device setting and management includes data in which the status of each equipment is sensed, and requires the punctuality for arriving at the destination at a fixed cycle so as to monitor the equipment. Examples of the control information system data include the setting of various parameter, such as threshold values for sensor device, collection of abnormality information (logs) stored in each equipment, firmware for updating each equipment, data that is statistical data indicating the status of each equipment and that requires punctuality, and the like. The content of the control information system data transmitted on the network is diverse, but is basically the data related to device setting and management, and thus the data size is assumed to be several kilobytes. Therefore, the communication cycle of the control information system data is preferably set to less than 100 msec. Although the communication cycle may be relatively long, the arrival time of data needs to be guaranteed. Besides, the arrival time may be specified arbitrarily by the user, or may be specified according to a rule predetermined by an application or a device that generates or requires data.

The (3) information system data is the data classified into information necessary for a host management system among the data used in information system communication, and includes data utilized in the host management system as a gist thereof. Examples of the information system data include data not requiring punctuality which is statistical data such as information collection performed by a sensor over a certain period of time, monitoring images (still images/moving images) captured under some conditions, or the like. The content of the control system data transmitted on the network is diverse, and the data size is also diverse. Typically, the data size of the information system data is assumed to be larger than the data size of the control information system data. In addition, since the information system data has no direct relationship with the control of the equipment, the information system data is assumed to be transmitted by a best-effort method. In this case, importance is concentrated on the degree of the throughput, not on the real-time performance (that is, the arrival of data at a specified time).

Besides, classification into the control system, the control information system, or the information system may be uniquely determined for each data, or classification into the control system, the control information system, or the information system may also be changed for the same data corresponding to the application thereof. In the latter case, typically, the type of the data is determined depending on how each data is used in the target layer. This classification may be set in advance for each data.

As described above, high-speed and high-precision communication is required for the control system data, and large-capacity communication is required for the information system data. Then, an intermediate characteristic between the control system data and the information system data is required for the control information system data.

The communication processing of the embodiment provides a configuration and processing in which a plurality of control devices connected to networks at the same level cooperates to transmit data while satisfying three mutually different types of requirements of the control devices. Specifically, the plurality of control devices shares the communication band possessed by the network and performs data transmission. Thereby, communication in which three types of data having different required characteristics is integrated on a single network is implemented.

As this network, it is preferable to employ a bus or a network for performing fixed-cycle communication in which the arrival time of the data is guaranteed. For example, networks of well-known protocols, such as EtherCAT® that is an example of a network for machine control, EtherNet/IP® that is an industrial open network in which a control protocol is mounted on a general-purpose Ethernet® or the like may be employed.

C. Time-Synchronization Function

The network of the control system 1 shown in FIG. 1 includes the control device 100 that controls a manufacturing device, a production facility or the like, and is configured to satisfy a so-called industrial network or the requirements conforming to the industrial network. As one of the requirements, the time when the data (control system data) sent from a transmission source arrives at the destination is guaranteed.

Furthermore, the network of the control system 1 includes the control device 300 that monitors, sets, and manages a manufacturing device, a production facility or the like, and provides a scheduling function for cooperating with the control device 100 to maintain a predetermined system cycle and store the control system data, the control information system data, and the information system data in a packet as appropriate.

In order to achieve the scheduling function while guaranteeing the arrival time to the destination, a communication system in which a plurality of communication devices time-synchronized with each other is connected via a network is employed. In other words, each of the communication devices constituting the network of the communication system has a time-synchronized timer (or a counter that is synchronously incremented or decremented), and each communication device determines the timing of data transmission or data reception according to the time-synchronized timers or counters.

In the example shown in FIG. 1, the control device 100 has a timer 101, the control device 300 has a timer 301, and the field equipment 200A-200D respectively have timers 201A-201D. For example, the timer 101 of the control device 100 functions as a grand master, and the timers of the control device 300 and the field equipment 200A-200D are time-synchronized based on this grand master. Due to the synchronization among the timers, the transmission timings of frames and the like can be matched with each other in the control system 1.

This time-synchronization between communication devices can be implemented by employing high-precision time-synchronization protocols such as IEEE (Institute of Electrical and Electronics Engineers) 1588, IEEE802. 1 AS, IEEE802. 1 AS-Rev, or the like.

D. Hardware Configuration

In the control system 1 of the embodiment, data is updated at every predetermined cycle in the field network 2. Moreover, the control device 100 and the control device 300 appropriately schedule each of the control system data, the control information system data, and the information system data. Besides, both the control device 100 and the control device 300 can be physically connected to one communication line through which the three types of data are transmitted.

In the embodiment, as a form of the scheduling, on the field network 2, the control device 100 is responsible for control system communication for exchanging control system data, and the control device 300 is responsible for control information system communication for exchanging control information system data and is also responsible for information system communication for exchanging information system data. In the following description, the control device 100 is referred to as "control system controller 100", and the control device 300 responsible for control information system communication and information system communication is also referred to as "control information system controller 300".

Figure 3:
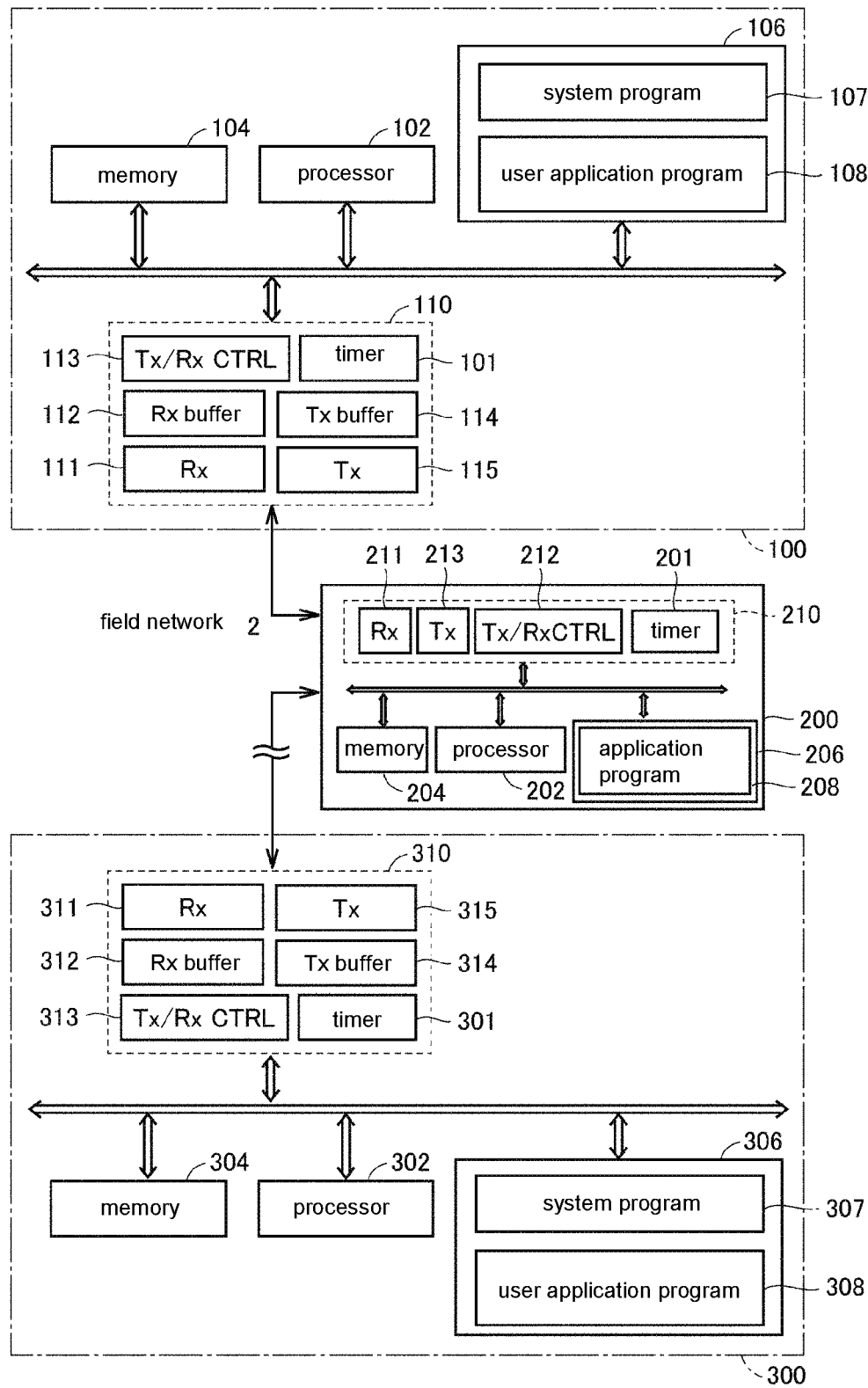
FIG. 3 is a schematic diagram showing an example of a hardware configuration of the control system of the embodiment.

FIG. 3 is a schematic diagram showing an example of a hardware configuration of the control system 1 of the embodiment. The control system controller 100 may be typically configured using a PLC as a base. The control information system controller 300 may be typically configured using an IPC as a base.

Referring to FIG. 3, the control system controller 100 includes a processor 102, a memory 104, a storage 106, and a network controller 110 as main components.

The processor 102 reads out a system program 107 and a user application program 108 stored in the storage 106 to the memory 104 and executes the programs, thereby implementing various processing including processing described later. The memory 104 consists of a volatile storage device such as a DRAM (Dynamic Random Access Memory), a SRAM (Static Random Access Memory), or the like. In addition to the system program 107 for controlling each part of the control system controller 100, the user application program 108 designed corresponding to the object to be controlled or the like is stored in the storage 106.

The network controller 110 provides an interface for the control system controller 100 to exchange data with various field equipment 200 via the field network 2. The network controller 110 includes a reception circuit (Rx) 111, a reception buffer 112, a transmission/reception controller 113, a transmission buffer 114, a transmission circuit (Tx) 115, and a timer 101 as main components.

The reception circuit 111 receives packets transmitted on the network controller 110 at a fixed cycle, and writes the data stored in the received packets into the reception buffer 112. The transmission/reception controller 113 sequentially reads out the received packets written into the reception buffer 112, outputs only the data necessary for processing in the control system controller 100 among the readout data to the processor 102. The transmission/reception controller 113 sequentially writes data or packets to be transmitted to another device into the transmission buffer 114 according to a command from the processor 102. The transmission circuit 115 sequentially sent out the data stored in the transmission buffer 114 corresponding to the cycle at which the packets are transmitted on the network controller 110. The timer 101 generates a pulse serving as a reference of timing for indicating transmission of communication frames from the transmission/reception controller 113 or the like. The timer 101 functions as a master clock (grand master clock) for managing time in the control system 1.

The control information system controller 300 includes a processor 302, a memory 304, a storage 306 storing a system program 307 and a user application program 308, and a network controller 310 as main components. The network controller 310 uses an interface for the control information system controller 300 to exchange data with various field equipment 200 via the field network 2. The network controller 310 provides an interface for the control information system controller 300 to exchange data with various field equipment 200 via the field network 2. The network controller 310 includes, as main components, a reception circuit (Rx) 311, a reception buffer 312, a transmission/reception controller 313, a transmission buffer 314, a transmission circuit (Tx) 315, and a timer 301. Since the functions of these components are the same as the functions of corresponding components of the control system controller 100, a detailed description is not repeated. However, the timer 301 synchronizes the timing with reference to the timer 101 that functions as a grand master clock.

The field equipment 200 realizes various functions necessary for implementing the control performed by the control system 1 on various facilities and devices. Typically, each of the field equipment 200 is responsible for collecting field information from the facility and device to be controlled or outputting command signals to the facility and device to be controlled or the like. Each of the field equipment 200 includes, as main components, a processor 202, a memory 204, a storage 206 storing an application program 208, and a communication circuit 210. The communication circuit 210 processes communication frames sequentially transmitted through the field network 2. That is, when the communication circuit 210 receives any communication frame via the field network 2, the communication circuit 210 performs data write-in and/or data read-out for the received communication frame, and then transmits the communication frame to the next field equipment 200 on the field network 2.

More specifically, the communication circuit 210 includes a reception circuit (Rx) 211, a transmission/reception controller 212, a transmission circuit (Tx) 213, and a timer 201. The reception circuit 211 and the transmission circuit 213 are parts physically connected to the field network 2, and perform processing such as reception and reproduction of the communication frames transmitted on the field network 2 according to a command from the transmission/reception controller 212 to thereby implement sequential transmission of the communication frames. The transmission/reception controller 212 performs data write-in and/or data read-out for the communication frames transmitted on the field network 2. The timer 201 generates a clock serving as a reference of timing of command output performed by the transmission/reception controller 212, processing execution in the field equipment 200, or the like. The timer 201 synchronizes the timing with reference to the timer 101 that functions as a grand master clock.

Figure 4:
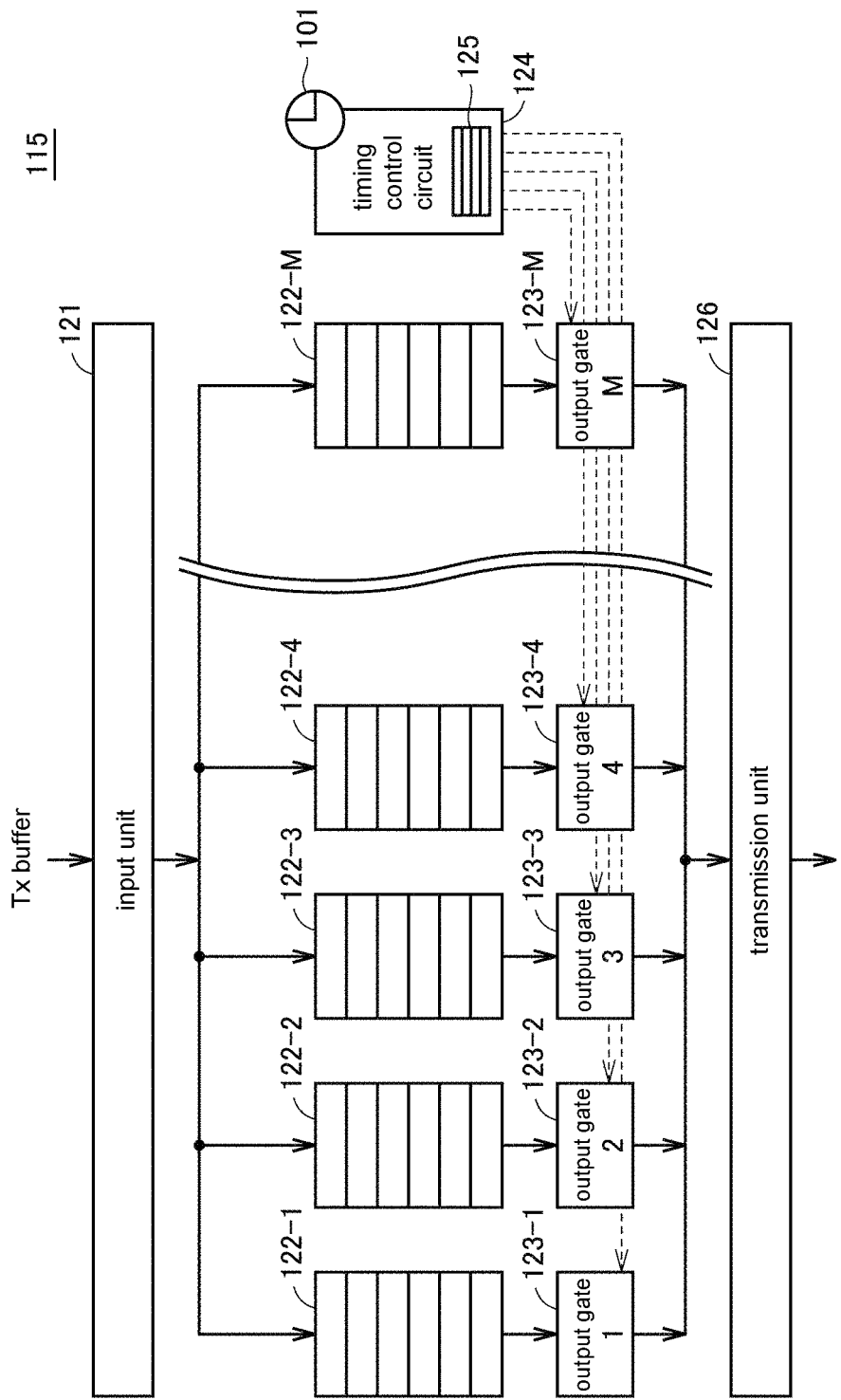
FIG. 4 is a schematic diagram showing a more detailed configuration of a transmission circuit of a control system controller shown in FIG. 3.

FIG. 4 is a schematic diagram showing a more detailed configuration of the transmission circuit 115 of the control system controller 100 shown in FIG. 3. Each of the transmission circuit 315 of the control information system controller 300 and the transmission circuit 213 of the field equipment 200 also has the same configuration as the transmission circuit 115 of the control system controller 100.

Referring to FIG. 4, the transmission circuit 115 includes an input unit 121, a plurality of queues 122-1 to 122-M (hereinafter, also collectively referred to as "queue 122"), a plurality of output gates 123-1 to 123-M (hereinafter, also collectively referred to as "output gate 123"), a timing control circuit 124, and a transmission unit 126.

The input unit 121 sequentially reads out data or packets stored in the transmission buffer 114 (FIG. 3) and to be transmitted to another device, and stores the data or packets in any one of the plurality of queues 122-1 to 112-M.

For example, the control system data is queued on the queue 122-1, the control information system data is queued on the queue 122-2, and the information system data is queued on the remaining queues 122-3 to 122-M.

The timing control circuit 124 has a timing control table 125. Timing information from the processor 102 is stored in the timing control table 125. The timing control circuit 124 refers to the timing information stored in the timing control table 125 and selectively activates the output gates 123-1 to 123-M. For example, when the control system data is transmitted, data read-out from the queue 122-1 is necessary, and thus the output gate 123-1 is activated. When the control information system data is transmitted, data read-out from the queue 122-2 is necessary, and thus the output gate 123-2 is activated. The timing control circuit 124 controls the timing for activating the output gates 123-1 to 123-M based on the timing information of the timing control table 125.

E. Software Configuration

Figure 5:
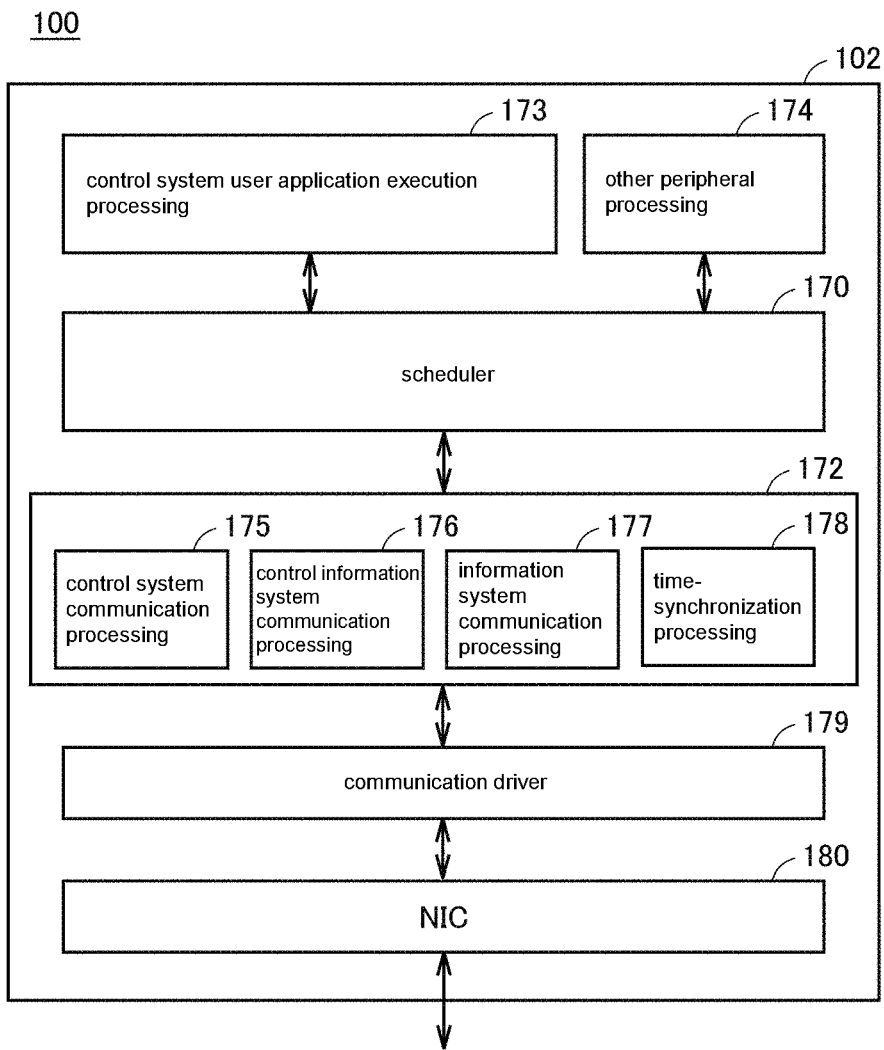
FIG. 5 is a schematic diagram showing an example of a software configuration of the control system controller for implementing communication processing of the embodiment.

Next, an example of a software configuration for implementing communication processing (scheduling) of the embodiment is described. FIG. 5 is a schematic diagram showing an example of the software configuration of the control system controller 100 for implementing the communication processing of the embodiment.

Referring to FIG. 5, a scheduler 170 is executed in the processor 102 of the control system controller 100. The scheduler 170 determines the execution order or execution interruption of a plurality of processing or the like according to a predetermined system cycle. More specifically, the scheduler 170 assigns processing resources (processor time, memory, and the like), according to a predetermined priority, system cycle and the like, to control system user application execution processing 173, peripheral processing 174 including various processing, and communication supervision processing 172.

The control system user application execution processing 173 includes processing related to the execution of the control system user application program.

The communication supervision processing 172 includes control system communication processing 175, control information system communication processing 176, information system communication processing 177, and time-synchronization processing 178. The control system communication processing 175 includes processing related to the control system data, for example, data creation, encoding, decoding, extraction, editing, and the like. Similarly, the control information system communication processing 176 includes processing related to the control information system data, and the information system communication processing 177 includes processing related to the information system data.

The time-synchronization processing 178 includes processing related to time-synchronization. For example, when the timer 101 of the control system controller 100 is set as the grand master clock, the time-synchronization processing 178 includes processing for adjusting the timer of the control information system controller 300 and the timer of the field equipment 200 based on the timer 101 so as to time-synchronize the control information system controller 300 and the field equipment 200. Alternatively, when the timer 301 of the control information system controller 300 is set as the grand master clock, the time-synchronization processing 178 includes processing for adjusting the timer 101 of the control system controller 100 based on the timer 301 of the control information system controller 300.

Furthermore, a communication driver 179 and a NIC (Network Interface Card) 180 are mounted on the processor 102 of the control system controller 100, and the communication driver 179 controls the network controller 110 (see FIG. 3) and the like. The NIC 180 is connected to a communication port that is not shown and manages data transmission on the field network 2.

Figure 6:
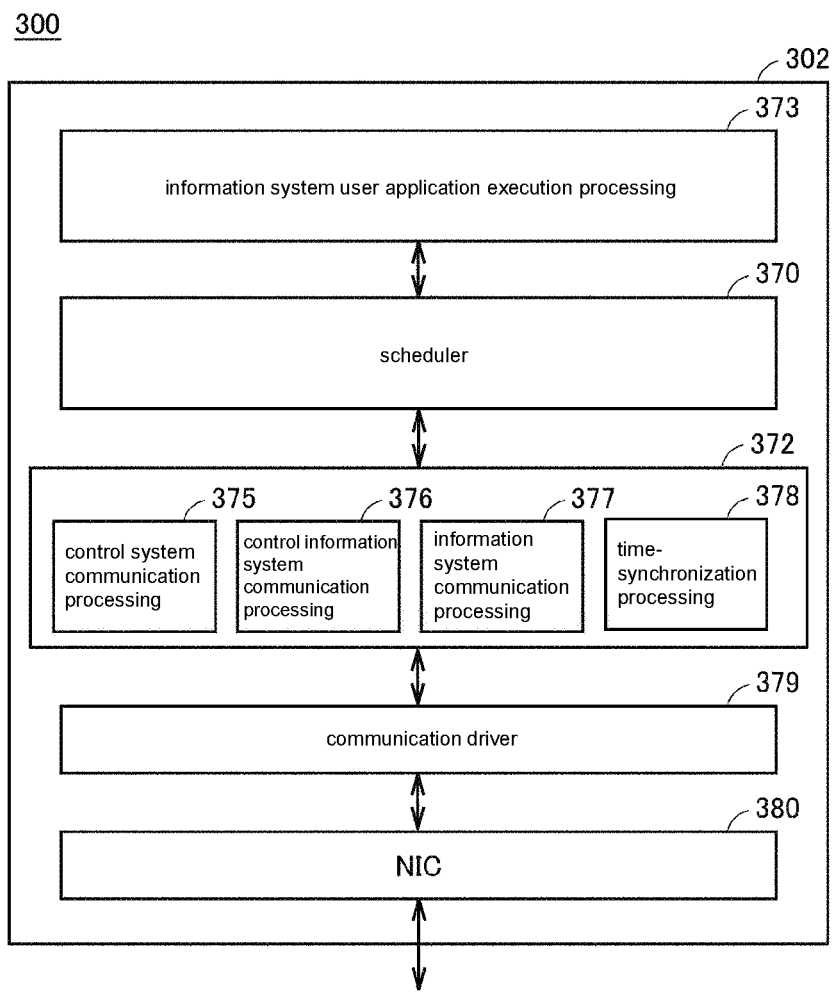
FIG. 6 is a schematic diagram showing an example of a software configuration of an information system controller for implementing the communication processing of the embodiment.

FIG. 6 is a schematic diagram showing an example of a software configuration of the control information system controller 300 for implementing the communication processing of the embodiment.

Referring to FIG. 6, in the processor 302 of the control information system controller 300, the scheduler 370 is executed in the same manner as in the processor 102 of the control controller 100 shown in FIG. 5. The scheduler 370 determines the execution order or execution interruption of a plurality of processing or the like according to a predetermined system cycle. More specifically, the schedule 370 assigns processing resources (processor time, memory, and the like), according to a predetermined priority, system cycle and the like, to information system user application execution processing 373, and communication supervision processing 372 (control system communication processing 375, control information system communication processing 376, information system communication processing 377, and time-synchronization processing 378).

The information system user application execution processing 373 includes processing related to the execution of the information system user application program.

The control system communication processing 375 includes processing related to the control system data, the control information system communication processing 376 includes processing related to the control information system data, and the information system communication processing 377 includes processing related to the information system data.

The time-synchronization processing 378 includes processing related to time-synchronization. For example, when the timer 101 of the control system controller 100 is set as the grand master clock, the time-synchronization processing 378 includes processing for adjusting the timer 301 of the control information system controller 300 based on the timer 101 of the control system controller 100. Alternatively, when the timer 301 of the control information system controller 300 is set as the grand master clock, the time-synchronization processing 378 includes processing for adjusting the timer of the control system controller 100 and the timer of the field equipment 200 based on the timer 301 so as to time-synchronize the control information system controller 300 and the field equipment 200.

Furthermore, a communication driver 379 and a NIC 380 are mounted on the processor 302 of the control information system controller 300. The communication driver 379 controls the network controller 110 (FIG. 3) and the like. The NIC 380 is connected to a communication port that is not shown and manages data transmission on the field network 2.

The scheduler 170 (see FIG. 5) of the control system controller 100 and the scheduler 370 (see FIG. 6) of the control information system controller 300 perform scheduling on the three types of data (the control system data, the control information system data, and the information system data) so that mutually different required characteristics can be satisfied.

F. Scheduling

The scheduling of the embodiment is applied to a network in which data is updated at every predetermined cycle; basically, priority is given to the control system communication, and the remaining communication bands are used to the fullest extent in other communications.

In this specification, the "communication band" refers to a resource for transmitting data on the network, and refers to a time width assigned for transmitting data when data is transmitted in a time division manner. Alternatively, when data is transmitted in a frequency division manner or a code division manner, the "communication band" may refer to a frequency or code sequence (logical channel) assigned for transmitting data.

The scheduling of the embodiment is directed to the problem of how to assign a necessary communication band to each of the control system communication performed by the control system controller 100 and the control information system communication (including the information system communication) performed by the control information system controller 300, under the restriction of the finite communication band possessed by the target network.

Figure 7:
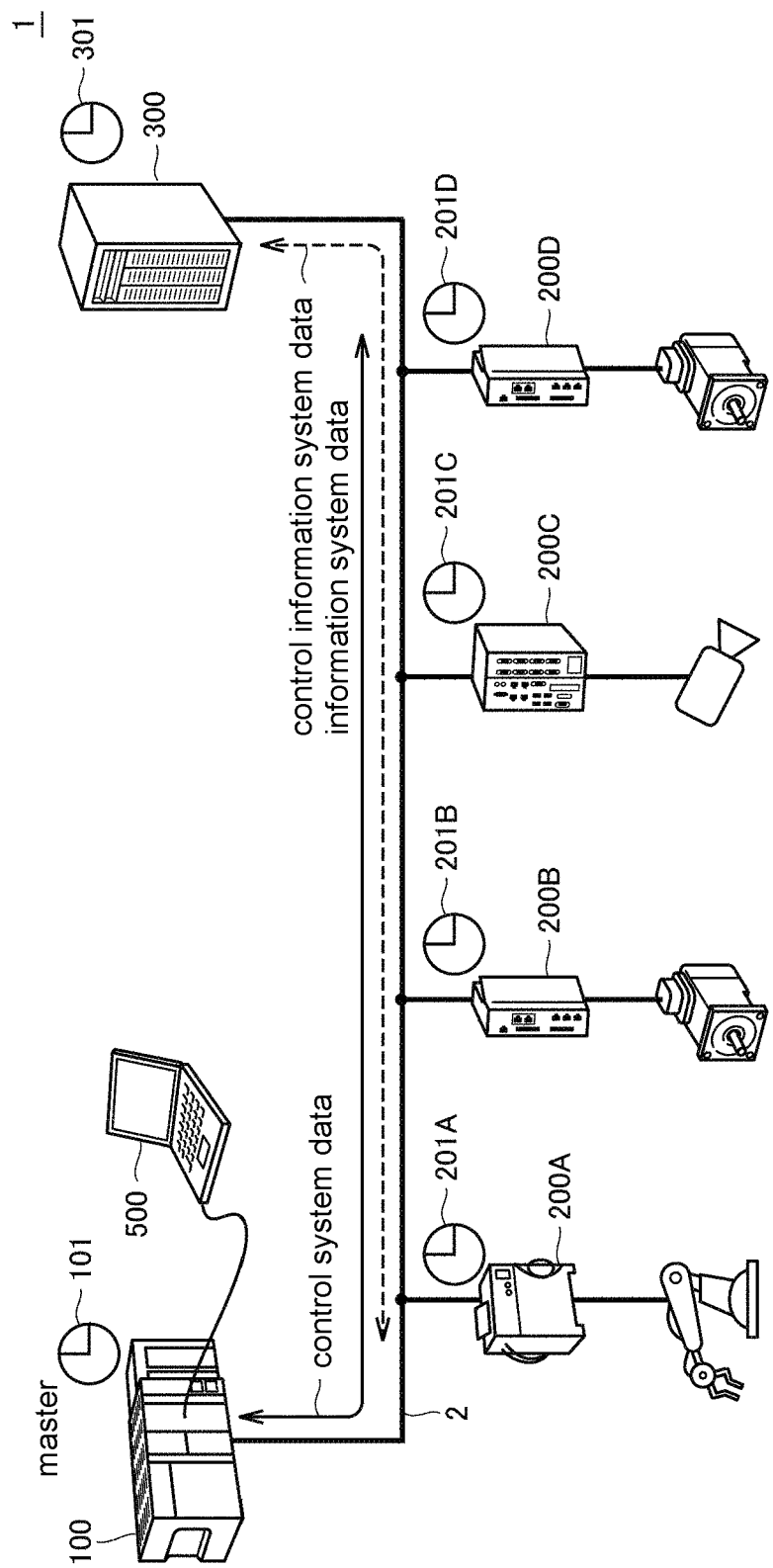
FIG. 7 is a schematic diagram showing a configuration example for implementing the communication processing of the embodiment.

The scheduling of the embodiment can be performed using a support device (see FIG. 7) connected to the control system controller 100 or the control information system controller 300. FIG. 7 illustrates a configuration in which a support device 500 is connected to the control system controller 100.

The support device 500 is a device that supports the preparation necessary for the control system controller 100 and the control information system controller 300 to control the object to be controlled. More specifically, the support device 500 provides a development environment (program creation and edit tool, parser, compiler, and the like) of programs executed by the control system controller 100 and the control information system controller 300, a setting environment for setting parameters (configurations) of the control system controller 100, the control information system controller 300, and various field equipment connected to them, a function for outputting the generated user programs to the control system controller 100 and the control information system controller 300, a function for correcting and changing user programs executed on the control system controller 100 and the control information system controller 300 online, and the like. The support device 500 is configured by a PC (personal computer) on which setting tools are installed, and the like.

Besides, in the control system 1 shown in FIG. 7, the control system controller 100 and the control information system controller 300 are configured separately from the support device 500, but a configuration may be employed in which the function of the support device 500 is loaded on the control system controller 100 or the control information system controller 300.

Hereinafter, a specific example of the communication processing (scheduling) of the embodiment is described.

Figure 8:
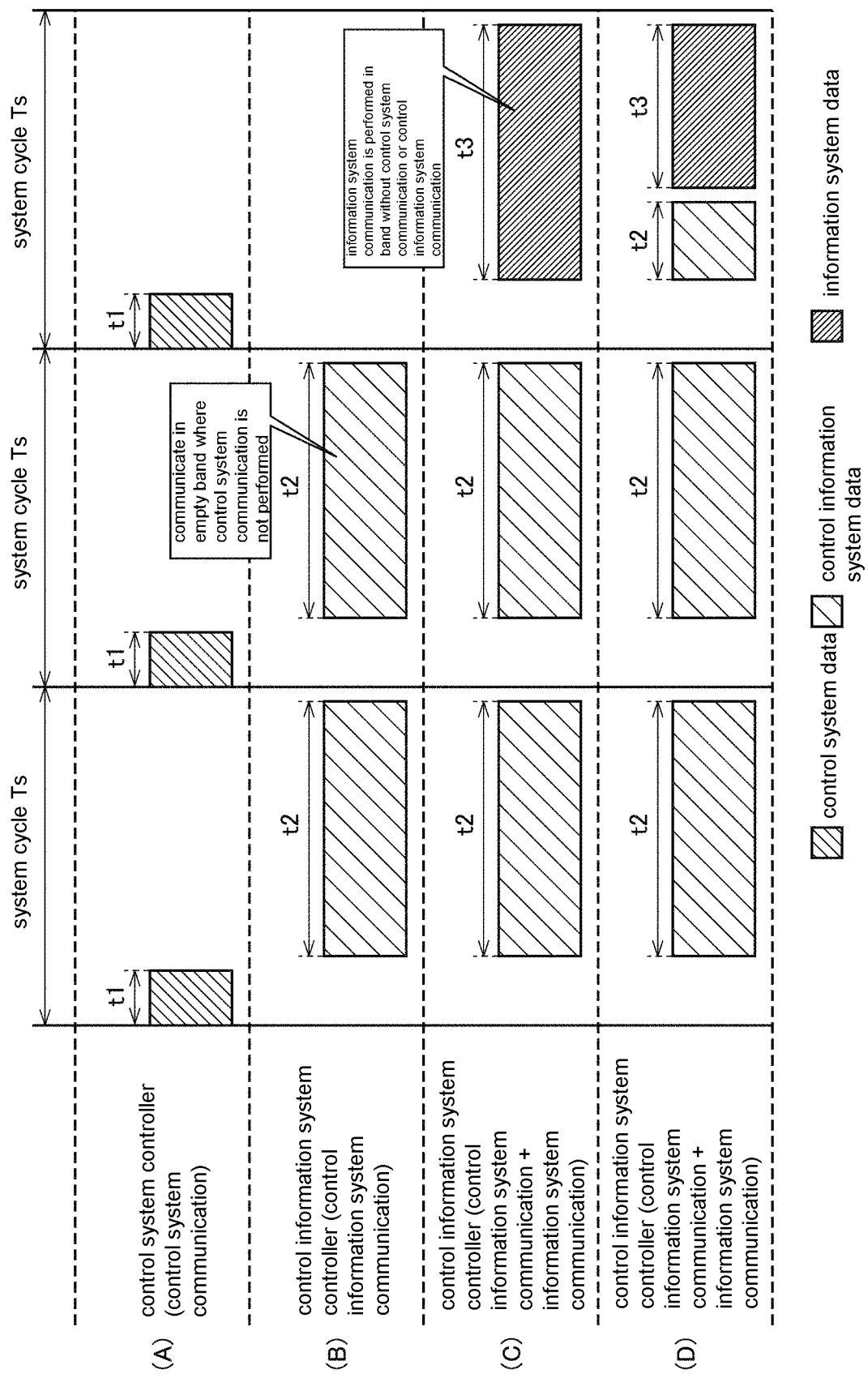
FIG. 8 is a schematic diagram for illustrating the communication processing of the embodiment.

FIG. 8 is a schematic diagram for illustrating the communication processing of the embodiment. Referring to FIG. 8, in the communication processing of the embodiment, transmission/reception of the control system data, the control information system data, and the information system data (respectively referred to as control system communication, control information system communication, and information system communication) are scheduled for a predetermined system cycle Ts.

First, the control system communication is assigned in priority. As shown in (A) of FIG. 8, a processing time t1 required for control system communication is assigned to the system cycle Ts first. The control system communication is performed between the control system controller 100 and the field equipment 200 via the field network 2.

As shown in (B) of FIG. 8, the control information system communication is performed as necessary in an empty band where the control system communication is not performed. That is, a processing time t2 required for the control information system communication is assigned to the remaining time excluding the processing time t1 required for the control system communication within the system cycle Ts. The control information system communication is performed between the control information system controller 300 and the field equipment 200 via the field network 2.

Since the control information system communication does not occur at all system cycles, as shown in (C) of FIG. 8, a processing time t3 required for information system communication may also be assigned to the remaining time excluding the processing time t1 required for control system communication within the system cycle Ts. That is, the information system communication is performed in a communication band where neither the control system communication nor the control information system communication exists. The information system communication is performed between the control information system controller 300 and the field equipment 200 via the field network 2.

In addition, as shown in (D) of FIG. 8, the processing time t1 required for control system communication, the processing time t2 required for control information system communication, and the processing time t3 required for information system communication may be assigned to the system cycle Ts.

Figure 9:
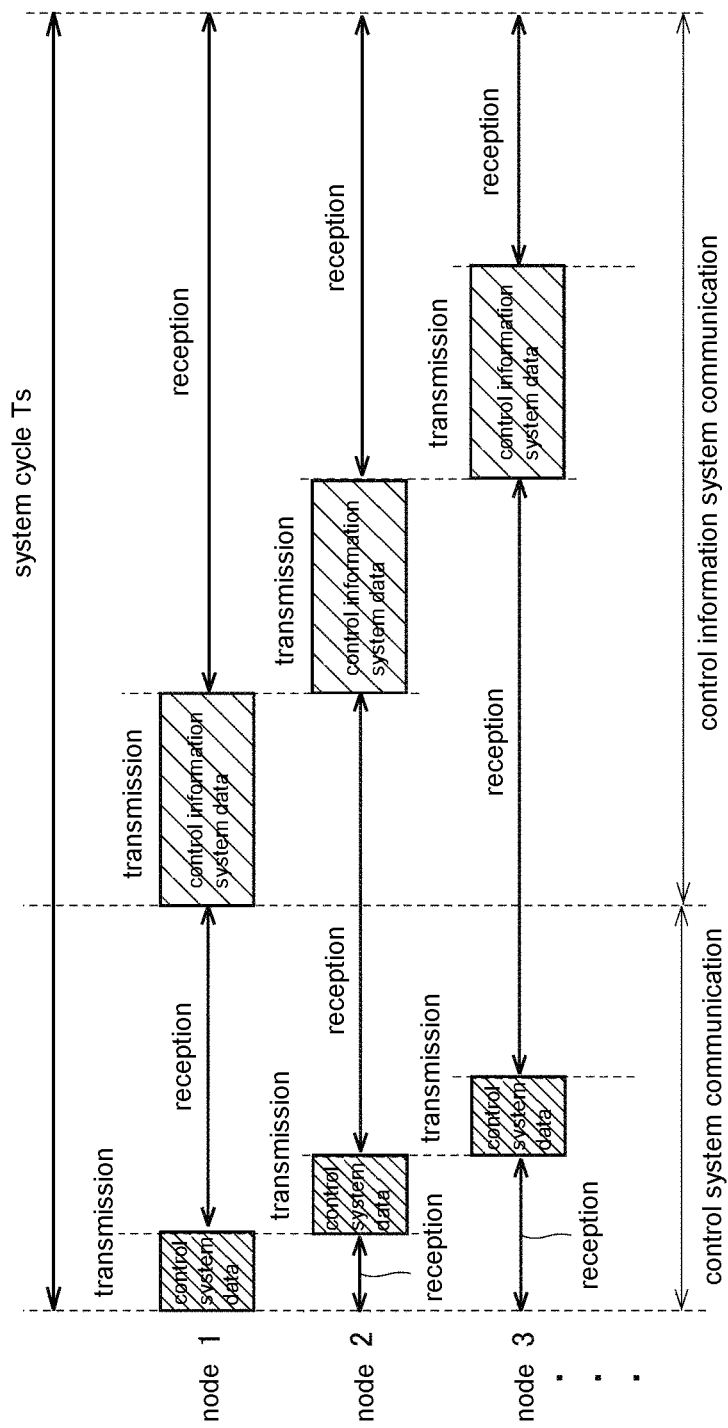
FIG. 9 is a schematic diagram for illustrating a procedure of the communication processing of the embodiment.

FIG. 9 is a schematic diagram for illustrating a procedure of the communication processing of the embodiment.

Referring to FIG. 9, at the time required for control system communication within the system cycle Ts, the control system data is transmitted/received between the control system controller 100 and the plurality of field equipment 200 connected to field network 2. At this time, in the control system controller 100 and each (node) of the plurality of field equipment 200, the timing at which the control system data is output from the transmission circuit (see FIG. 4) of the transmission/reception controller is controlled. Specifically, in the transmission circuit of each node, based on the timing information stored in the timing control table 125 (see FIG. 4), the timing control circuit 124 selectively activates a plurality of output gates 123 so that the control system data is output from the queue 122 in which control system data is stored.

For example, in one node (node 1 in FIG. 9) of the plurality of nodes, the control system data is transmitted to other nodes according to the timing control table 125, and then the control system data from other nodes can be received.

In another node (node 2 in FIG. 9) of the plurality of nodes, the control system data is transmitted to other nodes after the node 1 has transmitted the control system data according to the timing control table 125. Before and after the timing of transmitting the control system data, the node 2 can receive the control system data from other nodes.

In this manner, the plurality of nodes connected to the field network 2 sequentially transmits the control system data according to the predetermined timing control table, and the control system data transmitted from other nodes is received, thereby implementing the control system communication.

At the time required for control information system communication within the system cycle Ts, the control information system data is transmitted/received between the control information system controller 300 and the plurality of field equipment 200 via the field network 2. At this time, in the control information system controller 300 and each (node) of the plurality of field equipment 200, the timing at which the control information system data is output from the transmission circuit (see FIG. 4) of the transmission/reception controller is controlled. Specifically, in the transmission circuit of each node, based on the timing information stored in the timing control table 125 (see FIG. 4), the timing control circuit 124 selectively activates the plurality of output gates 123 so that the control information system data is output from the queue 122 in which control information system data is stored.

For example, in one node (node 1 in FIG. 9), the control information system data is transmitted to other nodes according to the timing control table 125, and then the control information system data from other nodes can be received. In another node (node 2 in FIG. 9), the control information system data is transmitted to other nodes after the node 1 has transmitted the control information system data according to the timing control table 125. Before and after the timing of transmitting the control information system data, the node 2 can receive the control information system data from other nodes.

In this manner, the plurality of nodes connected to the field network 2 sequentially transmits the control information system data according to the predetermined timing control table 125, and the control information system data transmitted from other nodes is received, thereby implementing the control information system communication.

Figure 10:
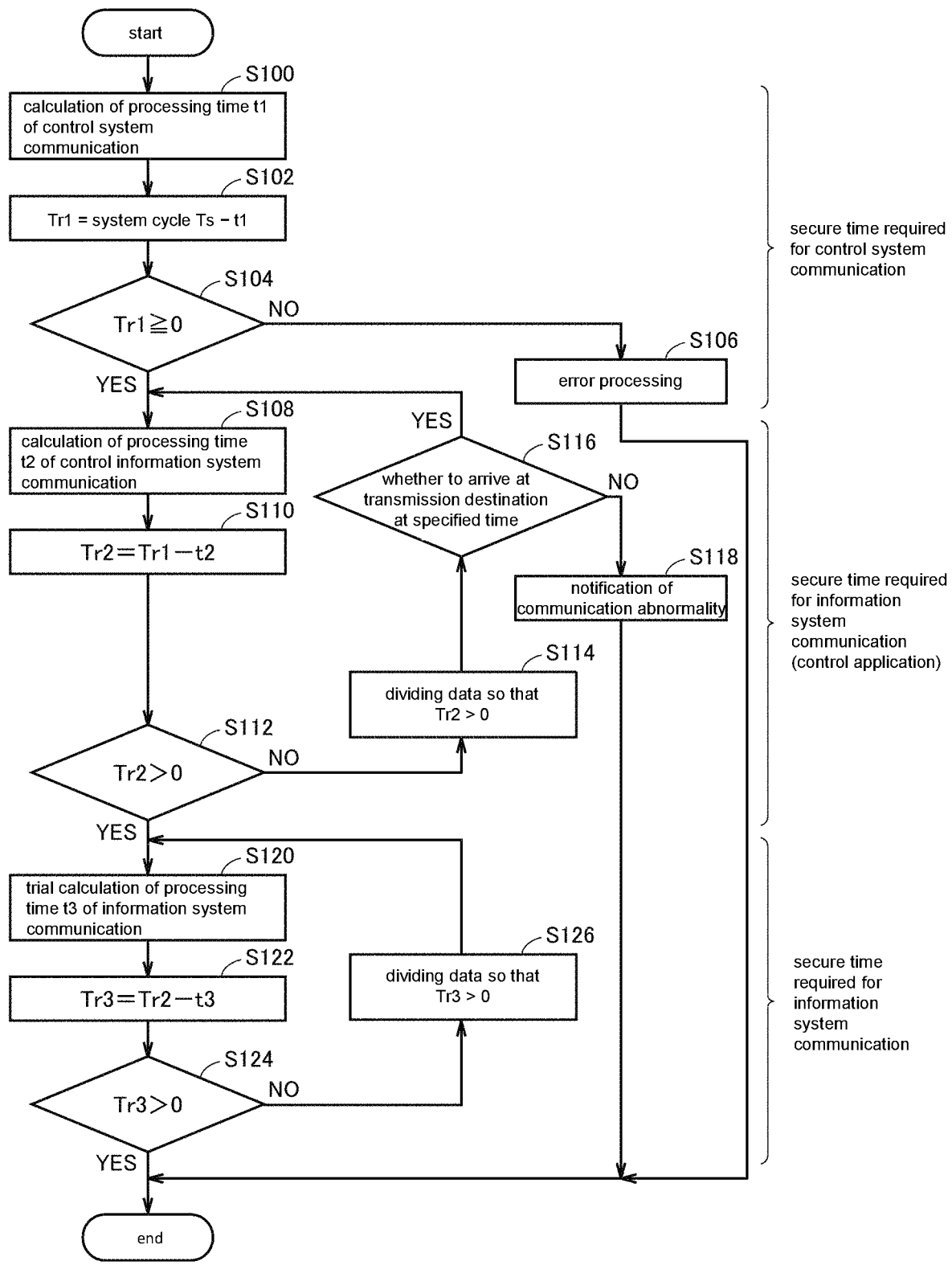
FIG. 10 is a flow chart showing a processing procedure of the communication processing (scheduling) of the embodiment.

FIG. 10 is a flowchart showing a processing procedure of the communication processing (scheduling) of the embodiment. The processing procedure shown in FIG. 10 is typically executed using the support device 500 (see FIG. 7).

When the processing shown in FIG. 10 is executed, the user uses the setting tools installed on the support device 500 to indicate the length of the system cycle Ts, data exchanged between the control system controller 100 and each field equipment 200, data exchanged between the control information system controller 300 and each field equipment 200, and the like. The above information is information necessary for determining the size of data handled in each of the control system communication and the control information system communication at every system cycle Ts.

Referring to FIG. 10, the support device 500 calculates the processing time t1 required for control system communication based on the above information (step S100), and calculates a remaining time Tr1 obtained by excluding the calculated processing time t1 from the system cycle Ts (step S102). Then, if the remaining time tr1 is a negative value (in the case of NO in step S104), it means that the time t1 required for control system communication exceeds the system cycle Ts, and thus the support device 500 executes error processing (step S106), and the processing ends.

The processing in steps S100 to S106 corresponds to scheduling processing for securing a first communication band necessary for updating, at every predetermined cycle, the control system data (the first data) used for controlling the manufacturing device or the production facility. In other words, in these steps, time required for control system communication is secured.

On the other hand, if the remaining time Tr1 is zero or more (in the case of YES in step S104), the support device 500 calculates the processing time t2 required for control information system communication (step S108), and calculates a remaining time Tr2 obtained by excluding the processing time t2 from the remaining time Tr1 calculated in step S102 (step S110). Then, if the remaining time Tr2 is a negative value (in the case of NO in step S112), it means that the target control information system communication cannot be added within the system cycle Ts, and thus the support device 500 divides the control information system data to be communicated so that the remaining time Tr2 becomes zero or more (step S114). That is, in the scheduling related to the control information system data, the target control information system data is divided into data sizes corresponding to communication bands that are available at every system cycle, and then each divided data is assigned to a plurality of system cycles.

Then, based on the number of data after the division of the control information system data to be communicated (that is, the number of necessary system cycles), determination is made on whether the target control information system data can arrive at the transmission destination within a specified time (step S116). If the target control information system data can arrive at the transmission destination within the specified time (YES in step S116), the processing in step S108 and subsequent steps is repeated. The divided data is reassigned after the next system cycle.

On the contrary, if the target control information system data cannot arrive at the transmission destination within the specified time (NO in step S116), communication abnormality is notified (step S118). The arrival time related to the control information system data may be specified in advance by the user or an application.

The communication abnormality may be notified using a method such as turning on a system flag, or a method such as turning on an indicator on the display surface of the management device. As described above, when the specified time (arrival time) of the control information system data cannot be guaranteed due to the division of the control information system data, the communication abnormality may be notified by an appropriate method. Upon receiving the notification of communication abnormality, the user can take measures such as relaxing the requirement for the specified time (arrival time) or reducing the application processing amount on the device side.

As described above, steps S116 and S118 corresponds to the processing for performing the abnormality notification when the control information system data cannot arrive at the transmission destination within the specified time due to the division of the control information system data.

The processing in steps S108 to S118 described above corresponds to scheduling processing for securing a communication band necessary for the control information system data (the second data) to arrive at the transmission destination within the specified time in a communication band other than the communication band directed to the control system data among the communication bands pos-sessed by the network. In other words, in these steps, the time required for control information system communication is secured. Besides, when there is no control information system data to be communicated, steps S108 to S118 may be skipped.

On the other hand, if the remaining time Tr2 is zero or more (in the case of YES in step S112), the management device calculates the processing time t3 required for information system communication (step S120), and calculates a remaining time Tr3 obtained by excluding the processing time t3 from the remaining time Tr2 calculated in step S110 (step S122). Then, if the remaining time Tr3 is a negative value (in the case of NO in step S124), it means that the target information system communication cannot be added within the system cycle Ts, and thus the management device divides the information system data to be communicated so that the remaining time Tr3 becomes zero or more (step S126). The divided data is reassigned after the next system cycle.

The processing in steps S120 to S126 corresponds to scheduling processing for securing a communication band for transmitting the information system data (the third data), in a communication band that is not set in either the communication band directed to the control system data or the communication band directed to the control information system data among the communication bands possessed by the network. In other words, these steps correspond to processing for securing the time required for information system communication. Besides, when there is no information system data to be communicated, steps S120 to S126 may be skipped.

By executing the processing procedure as described above, the scheduling shown in FIG. 8 is implemented. The support device 500 sends the first communication band set by the scheduling processing to the control system controller 100, and sends the second communication band and the third communication band set by the scheduling processing to the control information system controller 300.

In the processing procedure shown in FIG. 10, there is room in the specified time (arrival time) of the control information system communication, and a state is assumed in which the information system communication is not performed for a fixed time or longer and the frames that cannot be transmitted are accumulated. In this case, the three types of data, namely, the control system data, the control information system data, and the information system data can be transmitted or received at the same system cycle. However, when it is determined that the specified time (arrival time) for control information system communication cannot be guaranteed based on a line status when the information system communication is performed, the information system communication may not be performed. That is, the information system communication may be executed only in a period wherein there is room based on the line status or the like.

Furthermore, an exception in which the information system data is given priority over the control information system data may be arranged. For example, when the state, in which the information system communication is not performed for a fixed time or longer and the frames that cannot be transmitted are accumulated, continues for a longer time, and there is room in the control information system communication, the information system communication may be prioritized as long as the arrival time of the control information system communication is guaranteed. In other words, a communication band necessary for information system communication may be assigned first.

G. Modification Example

Next, a modification example of the control system 1 of the embodiment is described.

g1: Modification Example 1

Figure 11:
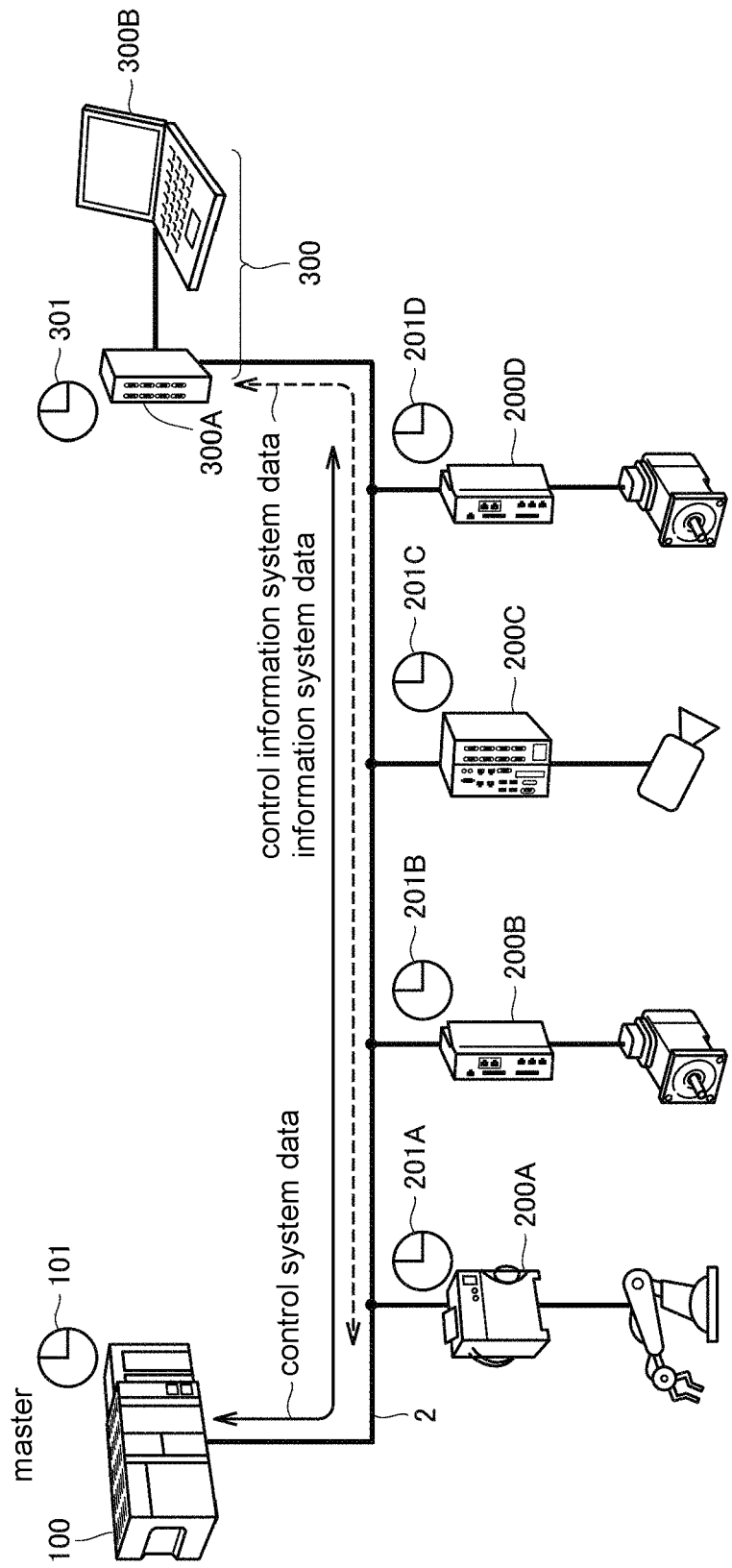
FIG. 11 is a schematic diagram showing an overall configuration example of a control system of Modification example 1 of the embodiment.

FIG. 11 is a schematic diagram showing an overall configuration example of the control system 1 of Modification example 1 of the embodiment. Referring to FIG. 11, the control system 1 of the modification example has the same basic configuration as the control system 1 shown in FIG. 1. The difference is that the control information system controller 300 includes a switch 300A and a PC (personal computer) 300B.

The switch 300A is a switch having a time-synchronization function and a scheduling function. The PC 300B may be configured based on a general-purpose PC for example. In the modification example, the communication processing of the above-described embodiment is implemented by the switch 300A and the PC 300B.

Figure 12:
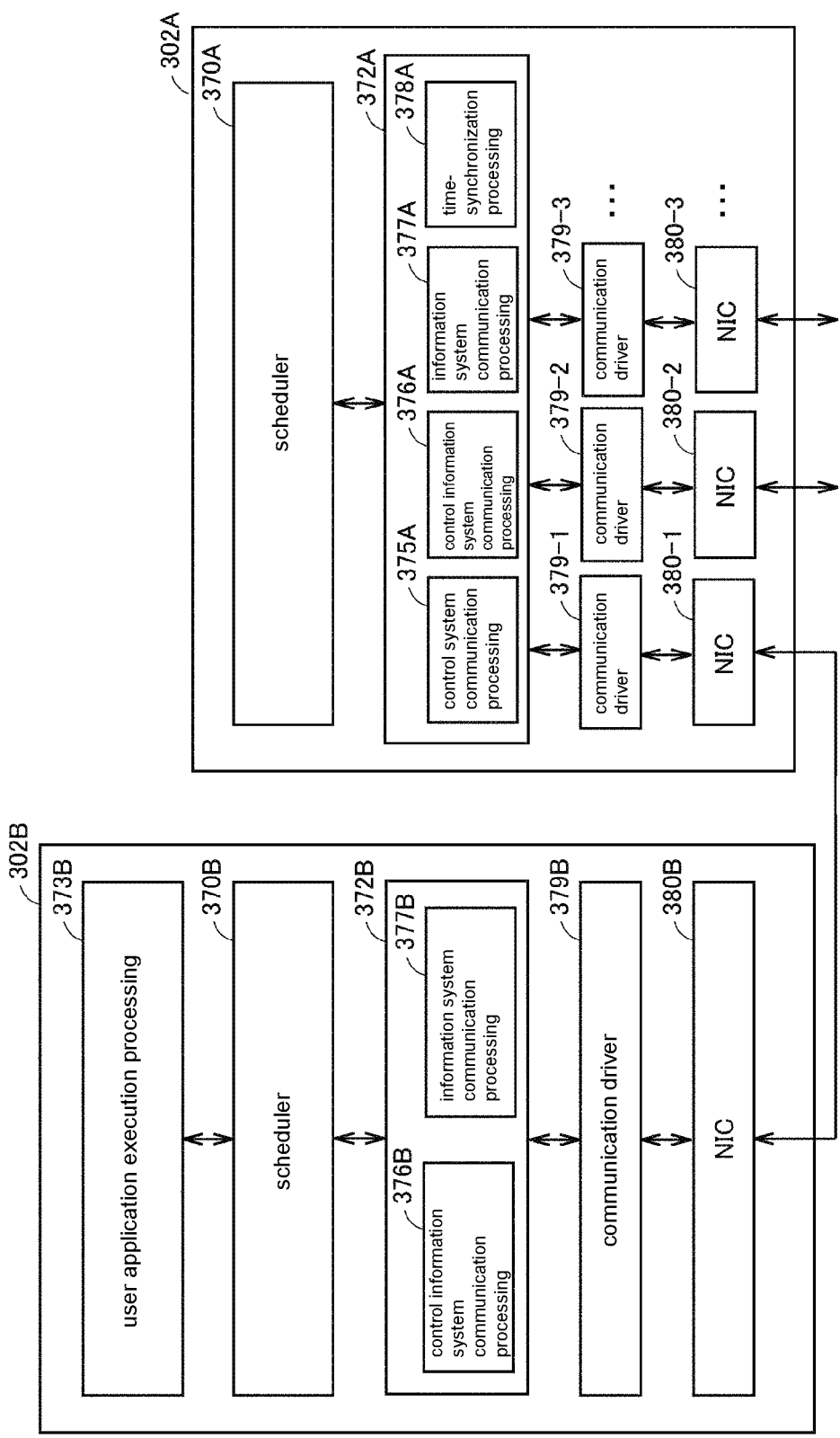
FIG. 12 is a schematic diagram showing an example of a software configuration of an information system controller in the control system of Modification example 1 of the embodiment.

FIG. 12 is a schematic diagram showing an example of a software configuration of the control information system controller 300 in the control system 1 of Modification example 1 of the embodiment. FIG. 12 shows an example of the software configuration of the switch 300A and the PC 300B.

Referring to FIG. 12, in a processor 302A of the switch 300A, a scheduler 370A is executed in the same manner as in the processor 302 of the control information system controller 300 shown in FIG. 6. The scheduler 370A determines the execution order or execution interruption of a plurality of processing or the like according to a predetermined system cycle. More specifically, the scheduler 370A assigns processing resources (processor time, memory, and the like) according to a predetermined priority, system cycle and the like to communication supervision processing 372A (control system communication processing 375A, control information system communication processing 376A, information system communication processing 377A, and time-synchronization processing 378A). Since the processing is similar to the corresponding processing of the control information system controller 300 shown in FIG. 6, a detailed description is not repeated.

A plurality of communication drivers 379-1 to 379-3 . . . and a plurality of NICs 380-1 to 380-3 . . . are mounted on the processor 302A of the switch 300A. Among the plurality of NICs 380-1 to 380-3 . . . , the NIC 380-1 is connected to a NIC 380B mounted on the PC 300B. The other NICs 380-2, 380-3 . . . are connected to a plurality of communication ports not shown. The NIC 380-1 manages data exchange with the PC 300B.

The scheduler 370B is executed in the processor 302B of the PC 300B. The scheduler 370B determines the execution order or execution interruption of the plurality of processing or the like in a non-real-time operation system environment. More specifically, the scheduler 370B assigns processing resources to information system user application execution processing 373B and communication supervision processing 372B (control information system communication processing 376B and information system communication processing 377B). Since the processing is similar to the corresponding processing of the control information system controller 300 shown in FIG. 6, a detailed description is not repeated.

A communication driver 379B and the NIC 380B are mounted on the processor 302B of the PC 300B. The communication driver 379B and the NIC 380B control data exchange with the communication driver 379-1 and the NIC 380-1 of the switch 300A.

In the communication processing of the modification example, the scheduler 170 (see FIG. 5) of the control system controller 100 and the scheduler 370A of the switch 300A perform scheduling so that mutually different required characteristics can be satisfied for the three types of data (the control system data, the control information system data, and the information system data).

g2: Modification Example 2

Figure 13:
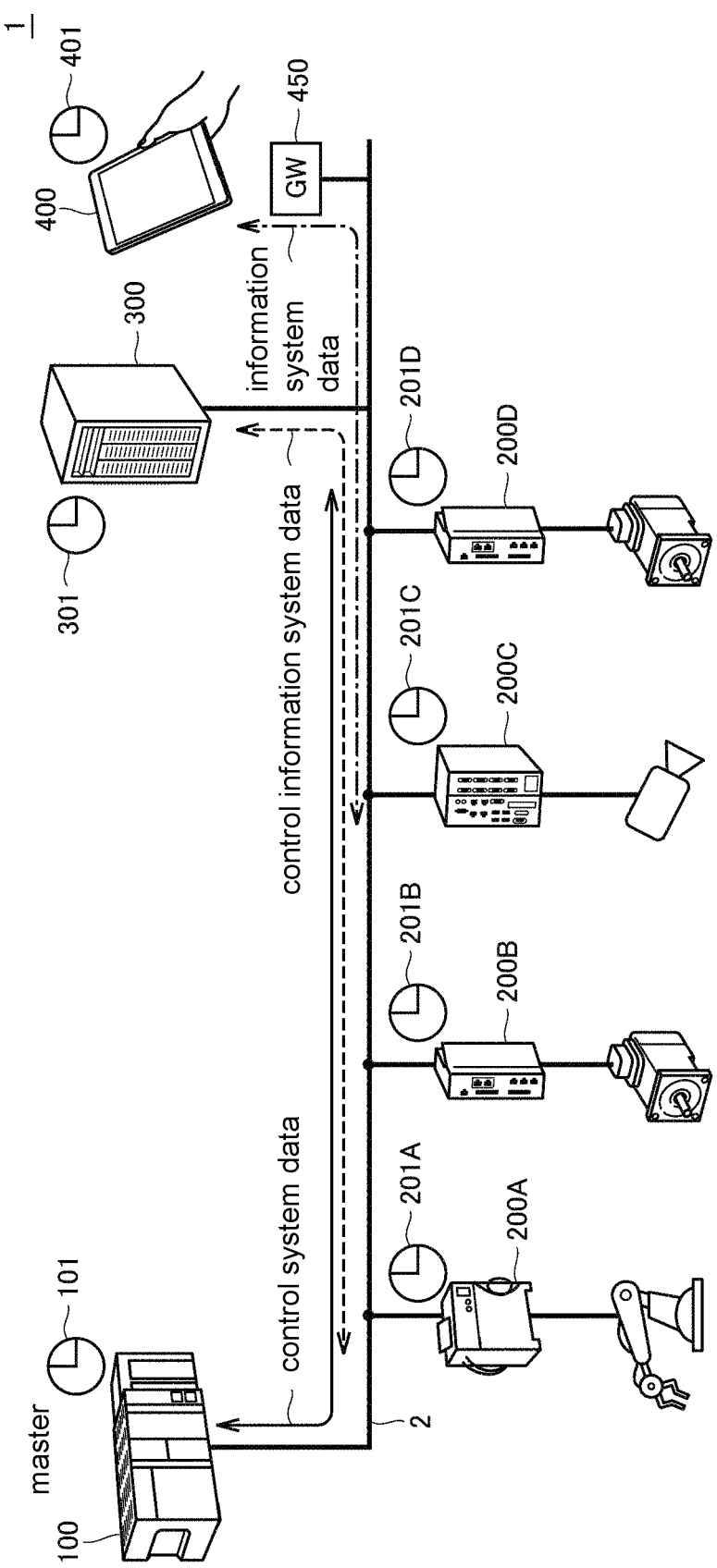
FIG. 13 is a schematic diagram showing an overall configuration example of a control system of Modification example 2 of the embodiment.

FIG. 13 is a schematic diagram showing an overall configuration example of the control system 1 of Modification example 2 of the embodiment. Referring to FIG. 13, the control system 1 of the modification example has the same basic configuration as the control system 1 shown in FIG. 1. The difference is that an information system terminal 400 is further connected to the field network 2.

The information system terminal 400 corresponds to a management equipment that acquires information from a facility or a device to be controlled, and monitors and manages production activities and the like in the production line/factory. In the example of FIG. 13, a gateway 450 is connected to the field network 2, and the gateway 450 mediates access from the information system terminal 400. The information system terminal 400 is, for example, a remote maintenance terminal consisting of a tablet terminal, and can access the field equipment 200 connected to the field network 2 via the gateway 450.

The information system data is exchanged between the information system terminal 400 and the field equipment 200. The information system terminal 400 has a timer 401. The timer 401 is synchronized with the timer of the control system controller 100, the timer of the control information system controller 300, and the timers of the field equipment 200A to 200D.

In the control system 1 of the modification example, the control system controller 100 exchanges control system data with the field equipment 200A to 200D according to a predetermined system cycle. The control information system controller 300 exchanges control information system data with the field equipment 200 while guaranteeing the arrival time. The information system terminal 400 exchanges information system data with the field equipment 200 in a best-effort format. That is, the control system controller 100 is responsible for control system communication, the control information system controller 300 is responsible for control information system communication, and the information system terminal 400 is responsible for information system communication. The information system terminal 400 corresponds to an example of the "third control device" of the present invention.

In the scheduling of the modification example, under the restriction of a finite communication band possessed by the target network, a necessary communication band is assigned to each of the control system communication of the control system controller 100, the control information system communication of the control information system controller 300, and the information system communication of the information system terminal 400.

As described above, separate devices (the control information system controller 300 and the information system terminal 400) are respectively responsible for control information system communication and information system communication, and thereby the processing load for each device can be further reduced. Accordingly, it is possible to suppress restriction on the data amount of the control information system data and the information system data transmitted on the network. Thereby, in the host management system, the information necessary for managing the manufacturing device or the production facility can be collected with high time precision, and thus the predictive management of the manufacturing device or the production facility can be performed with high precision.

Figure 14:
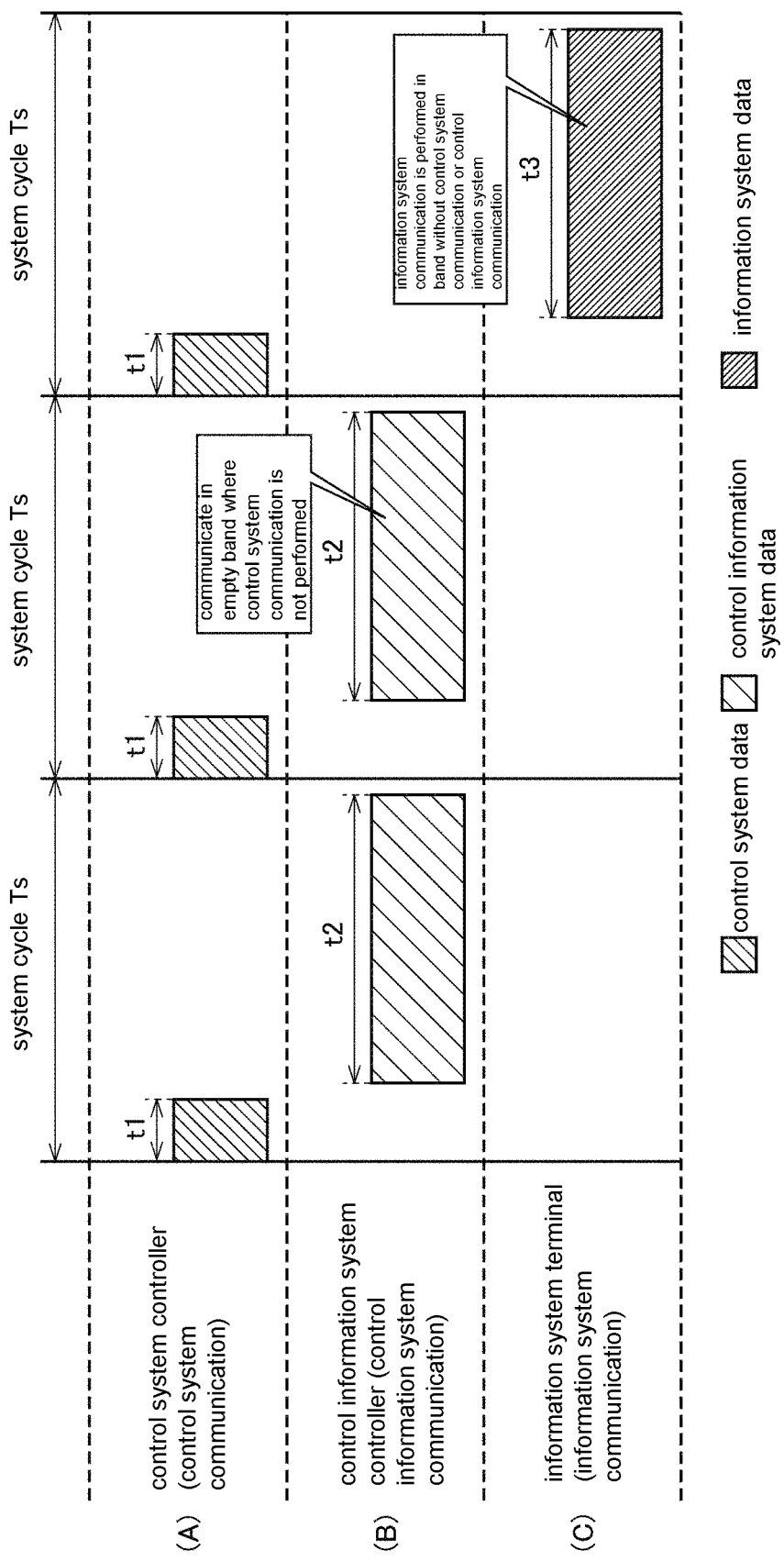
FIG. 14 is a schematic diagram for illustrating communication processing of Modification example 2 of the embodiment.

FIG. 14 is a schematic diagram for illustrating communication processing of Modification example 2 of the embodiment. Referring to FIG. 14, in the communication processing of Modification example 2 of the embodiment, the control system communication, the control information system communication, and the information system communication are scheduled for the predetermined system cycle Ts.

First, the control system communication is assigned in priority. As shown in (A) of FIG. 14, the processing time t1 required for control system communication is assigned to the system cycle Ts first. The control system communication is performed between the control system controller 100 and the field equipment 200 via the field network 2.

As shown in (B) of FIG. 14, the control information communication is performed as necessary in an empty band where the control system communication is not performed. That is, the processing time t2 required for control information system communication is assigned to the remaining time obtained by excluding the processing time t1 required for control system communication from the system cycle Ts. The control information system communication is performed between the control information system controller 300 and the field equipment 200 via the field network 2.

Since the control information system communication does not occur at all system cycles, as shown in (C) of FIG. 14, the processing time t3 required for information system communication may also be assigned to the remaining time obtained by excluding the processing time t1 required for control system communication from the system cycle Ts. That is, the information system communication is performed in a communication band where neither the control system communication nor the control information system communication exists. The information system communication is performed between the information system terminal 400 and the field equipment 200 via the field network 2.

In the example of FIG. 14, control system data is exchanged between the control system controller 100 and the field equipment 200A to 200D according to the system cycle Ts. Control operations of the control system controller 100 and the field equipment 200A to 200D can be implemented by the exchange of the control system data.

For example, during the operation of the field equipment 200A to 200D, an image captured by a camera constituting the field equipment 200C is transmitted as information system data to the information system terminal 400 via the gateway 450. A user (maintenance staff) of the information system terminal 400 (remote maintenance terminal) can remotely monitor the status by the image displayed on the information system terminal 400.

When any abnormality occurs in the field equipment 200A, the field equipment 200A transmits information indicating the abnormality content as control information system data to the control information system controller 300 via the field network 2. The message is transmitted from the control information system controller 300 to the information system terminal 400 (remote maintenance terminal) via the gateway 450. In the information system terminal 400, the image captured by the camera and the received abnormality information are presented to the user (maintenance staff) of the information system terminal 400. As an example of the presentation, the content of the abnormality information may be displayed in association with a site at which the abnormality on the actually captured image has occurred based on the received abnormality information.

g3: Modification Example 3

Figure 15:
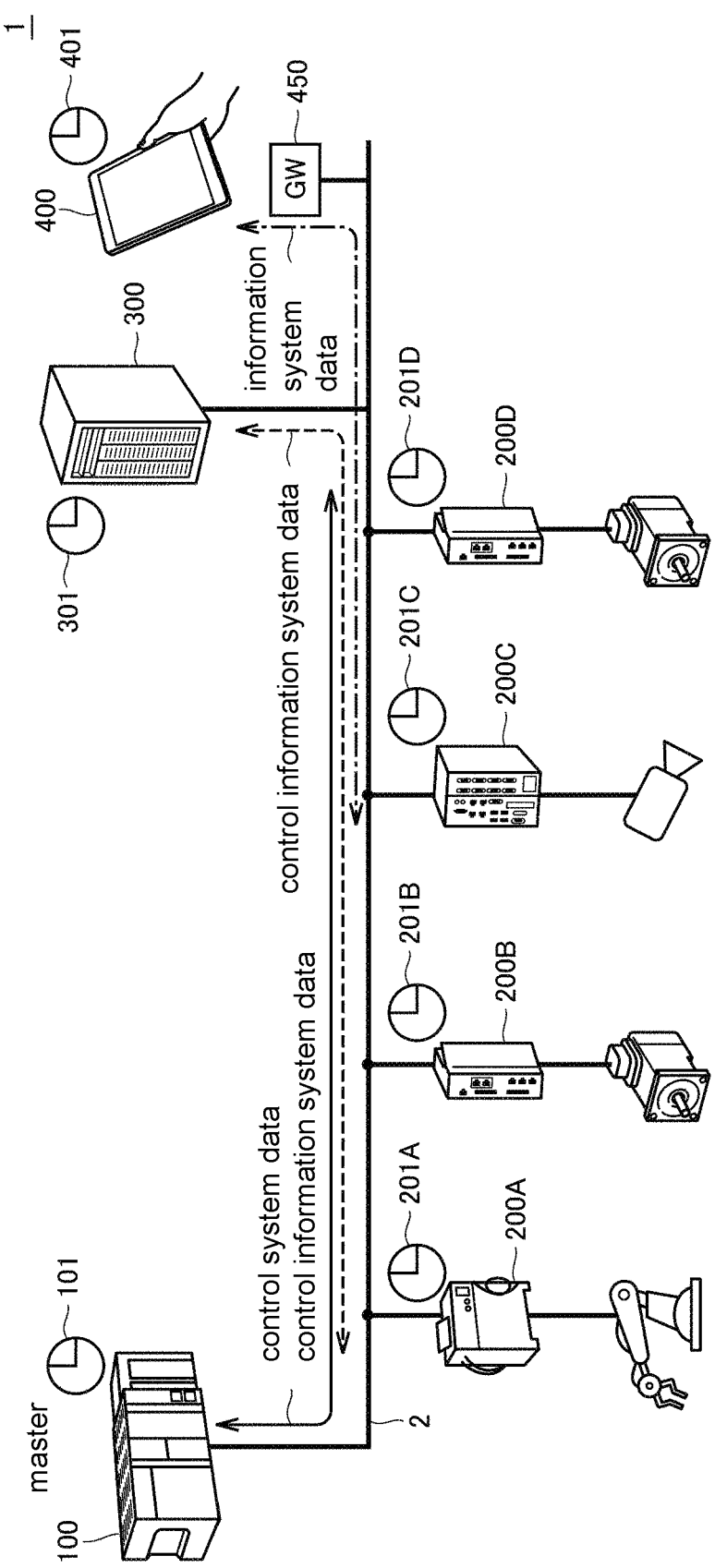
FIG. 15 is a schematic diagram showing an overall configuration example of a control system of Modification example 3 of the embodiment.

FIG. 15 is a schematic diagram showing an overall configuration example of the control system 1 of Modification example 3 of the embodiment. Referring to FIG. 15, the control system 1 of the modification example has the same basic configuration as the control system 1 shown in FIG. 1. The difference is that the control system controller 100 is responsible for control information system communication in addition to control system communication. That is, in the modification example, the control system controller 100 and the control information system controller 300 share the responsibility of control information system communication.

In the control system 1 of the modification example, the control system controller 100 exchanges the control system data with the field equipment 200A to 200D according to a predetermined system cycle. The control system controller 100 further exchanges the control information system data with the field equipment 200 while guaranteeing the arrival time.

The control information system controller 300 shares the control information system data with the control system controller 100. The control information system controller 300 exchanges the to-be-shared control information system data with the field equipment 200 while guaranteeing the arrival time.

The information system terminal 400 exchanges the information system information with the field equipment 200 in a best-effort format.

In the scheduling of the modification example, under the restriction of a finite communication band possessed by the target network, a necessary communication band is assigned to each of the control system communication and the control information system communication of the control system controller 100, the control information system communication of the control information system controller 300, and the information system communication of the information system terminal 400.

As described above, a plurality of controllers sharing the responsibility of control information communication, and thereby the processing load for each controller can be reduced. Accordingly, it is possible to suppress restriction on the data amount of the control information system data and the information system data transmitted on the network. Thereby, in the host management system, the information necessary for managing the manufacturing device or the production facility can be collected with high time precision, and thus the predictive management of the manufacturing device or the production facility can be performed with high precision.

Figure 16:
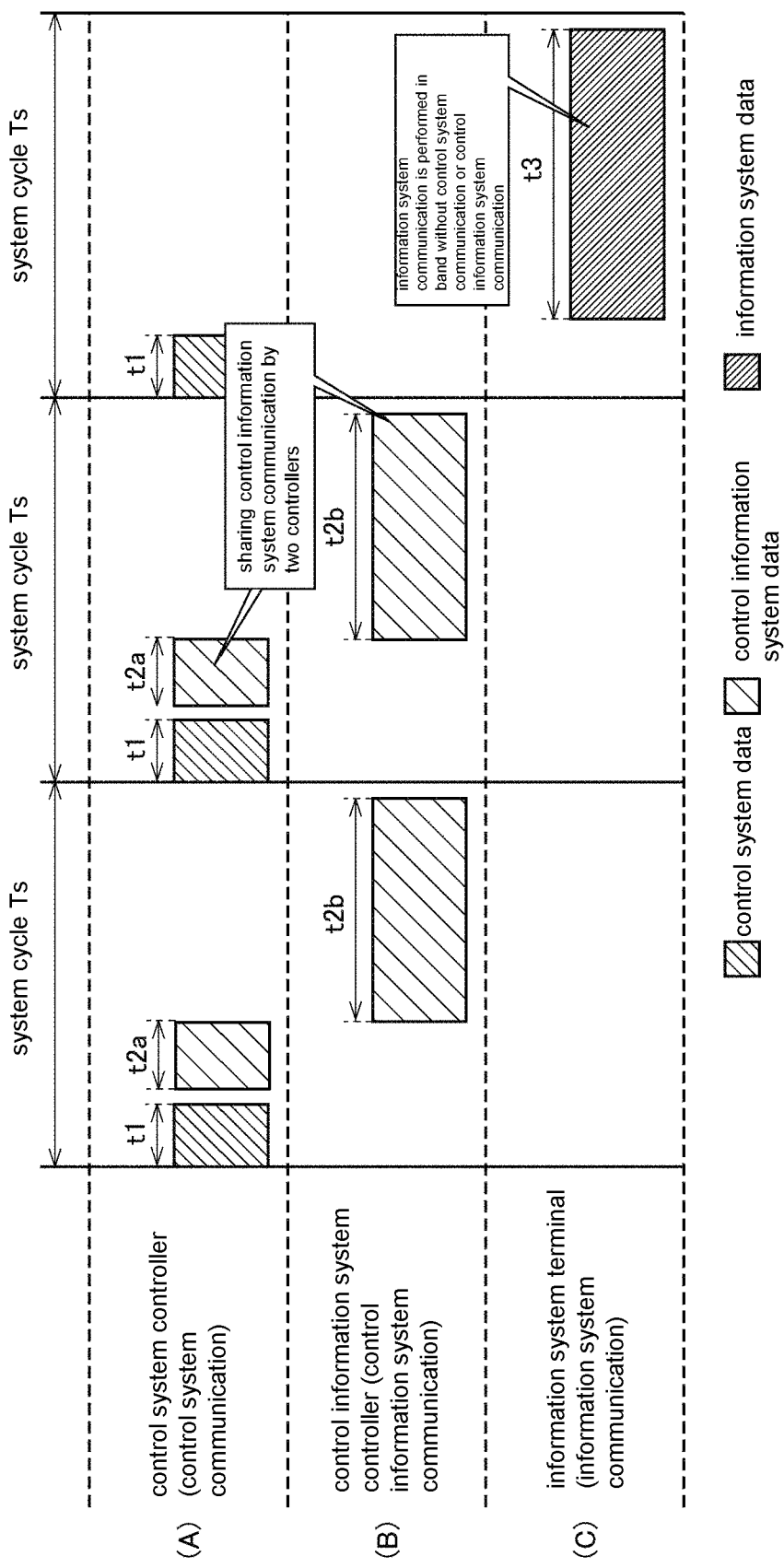
FIG. 16 is a schematic diagram for illustrating communication processing of Modification example 3 of the embodiment.

FIG. 16 is a schematic diagram for illustrating communication processing of Modification example 3 of the embodiment. Referring to FIG. 16, in the communication processing of Modification example 3 of the embodiment, control system communication, control information system communication, and information system communication are scheduled for the predetermined system cycle Ts.

First, the control system communication is assigned in priority. As shown in (A) of FIG. 16, the processing time t1 required for control system communication is assigned to the system cycle Ts first. The control system communication is performed between the control system controller 100 and the field equipment 200 via the field network 2.

The control system communication is performed as necessary in an empty band where the control system communication is not performed. That is, the processing time t2 required for control information system communication is assigned to the remaining time obtained by excluding the processing time t1 required for control system communication from the system cycle Ts.

As shown in (A) and (B) of FIG. 16, the processing time t2 required for control information system communication is divided into a processing time t2a and a processing time t2b, and are assigned to the control system controller 100 and the control information system controller 300. Accordingly, at the processing time t2a, the control information system communication is performed between the control system controller 100 and the field equipment 200 via the field network 2; at the processing time t2b, the control information system communication is performed between the control information system controller 300 and the field equipment 200 via the field network 2.

Since the control information system communication does not occur at all system cycles, as shown in (C) of FIG. 16, the processing time t3 required for information system communication may also be assigned to the remaining time obtained by excluding the processing time t1 required for control system communication from the system cycle Ts. That is, the information system communication is performed in a communication band where neither the control system communication nor the control information system communication exists. The information system communication is performed between the information system terminal 400 and the field equipment 200 via the field network 2.

H. Advantage

As described above, according to the communication method of the control system of the embodiment, a communication band necessary for updating, at every predetermined cycle, data (control system data) used for controlling the manufacturing device or the production facility, and a communication band for transmitting data related to setting and management of the manufacturing device or the production facility (control information system data requiring punctuality which is the data indicating the status of the manufacturing equipment or the production facility) and information system data having a larger data size are respectively assigned to a plurality of control devices connected to the same network, and thereby it is possible to transmit the control system data, the control information system data, and the information system data on the same network while satisfying each requirement, without increasing the processing load of each of the plurality of control devices.

Thereby, in the control system for controlling the manufacturing device or the production facility, information necessary for managing the manufacturing device or the production facility can be collected while the manufacturing device or the production facility is controlled at a high speed and with high precision, and thus the predictive management of the manufacturing device or the production facility can be performed with high precision. For example, the precision of failure prediction of the manufacturing device or the production facility can be improved, and thus high efficiency in troubleshooting can be achieved.

APPENDIX

As described above, the embodiment includes the following disclosures.

(1) In the embodiment, a control system (1) that controls a manufacturing device or a production facility is provided. The control system (1) includes a first control device (100) connected to a network (2) in which data is updated at every predetermined cycle, and a second control device (300) connected to the network (2) and time-synchronized with the first control device (100). The first control device (100) transmits, at every predetermined cycle, first data used for controlling the manufacturing device or the production facility, using a first communication band among communication bands possessed by the network. The second control device transmits second data used for setting and managing the manufacturing device or the production facility, using a second communication band other than the first communication band among the communication bands possessed by the network.

(2) In the control system (1) of the embodiment, preferably, the first control device (100) cyclically transmits the first data using the first communication band, and transmits the second data using a part of the second communication band. The second control device (300) transmits the second data using a communication band other than the part of the second communication band.

(3) In the control system (1) of the embodiment, preferably, the second control device (300) further transmits third data using a communication band that is not set in either the first communication band or the second communication band among the communication bands possessed by the network.

(4) In the control system (1) of the embodiment, preferably, the second control device (300) divides the second data into data sizes corresponding to the communication bands available at every cycle, and then assigns the divided data to a plurality of cycles.

(5) In the control system (1) of the embodiment, preferably, a third control device (400) connected to the network and time-synchronized with the first control device (100) and the second control device (300) is further included. The third control device (300) transmits third data using a communication band that is not set in either the first communication band or the second communication band among the communication bands possessed by the network.

(6) In the embodiment, a communication method in a control system (1) that controls a manufacturing device or a production facility is provided. The control system (1) includes a first control device (100) connected to the network (2) in which data is updated at every predetermined cycle, and a second control device (300) connected to the network (2) and time-synchronized with the first control device (100). The communication method includes: a step in which the first control device (100) transmits, at every predetermined cycle, first data used for controlling the manufacturing device or the production facility, using a first communication band among communication bands possessed by the network; and a step in which the second control device (300) transmits second data used for setting and managing the manufacturing device or the production facility, using a second communication band other than the first communication band among the communication bands possessed by the network.

(7) In the communication method of the embodiment, preferably, a step is further included in which the second control device (300) transmits third data using a communication band that is not set in either the first communication band or the second communication band among the communication bands possessed by the network (2).

(8) In the communication method of the embodiment, preferably, the control system (1) further includes a third control device (400) connected to the network (2) and time-synchronized the first control device (100) and the second control device (300). The communication method further includes a step in which the third control device (400) transmits third data using a communication band that is not set in either the first communication band or the second communication band among the communication bands possessed by the network (2).

The embodiments disclosed herein should be considered as illustrative but not restrictive in all respects. The scope of the present invention is shown by the scope of the claims instead of the above description, and is intended to include meaning equivalent to the scope of the claims and all changes within the scope.

What is claimed is:

1. A control system, which controls a manufacturing device or a production facility, comprising:
    a first control device connected to a network in which data is updated at every predetermined cycle, and
    a second control device connected to the network and time-synchronized with the first control device;
    wherein the first control device transmits to the manufacturing device or the production facility, at every predetermined cycle, first data used for controlling the manufacturing device or the production facility, using a first communication band among communication bands possessed by the network; and
    the second control device transmits to the manufacturing device or the production facility second data used for setting and managing the manufacturing device or the production facility, using a second communication band other than the first communication band among the communication bands possessed by the network, wherein
    the first control device cyclically transmits to the manufacturing device or the production facility the first data using the first communication band, and transmits to the manufacturing device or the production facility the second data using a part of the second communication band, and
    the second control device transmits to the manufacturing device or the production facility the second data using a communication band other than the part of the second communication band,
    the first communication band and the second communication band refer to a time width in a time division manner, a frequency in a frequency division manner, or a code sequence in a code division manner.

2. The control system according to claim 1, wherein the second control device further transmits third data using a communication band that is not set in either the first communication band or the second communication band among the communication bands possessed by the network.

3. The control system according to claim 1, wherein the second control device divides the second data into data sizes corresponding to the communication bands available at every cycle, and then assigns the divided data to a plurality of cycles.

4. The control system according to claim 1, further comprising a third control device connected to the network and time-synchronized with the first control device and the second control device, wherein
    the third control device transmits third data using a communication band that is not set in either the first communication band or the second communication band among the communication bands possessed by the network.

5. The control system according to claim 1, wherein the first control device is embodied by a PLC, and the second control device is embodied by an Industrial PC.

6. A communication method in a control system which controls a manufacturing device or a production facility,
    wherein the control system comprises:
    a first control device connected to a network in which data is updated at every predetermined cycle, and
    a second control device connected to the network and time-synchronized with the first control device;
    the communication method comprises: a step in which the first control device transmits to the manufacturing device or the production facility, at every predetermined cycle, first data used for controlling the manufacturing device or the production facility, using a first communication band among communication bands possessed by the network;
    a step in which the second control device transmits to the manufacturing device or the production facility second data used for setting and managing the manufacturing device or the production facility, using a second communication band other than the first communication band among the communication bands possessed by the network; and
    a step in which the second control device transmits third data using a communication band that is not set in either the first communication band or the second communication band among the communication bands possessed by the network,
    wherein the first communication band and the second communication band refer to a time width in a time division manner, a frequency in a frequency division manner, or a code sequence in a code division manner.

7. The communication method according to claim 6, wherein the control system further comprises a third control device connected to the network and time-synchronized with the first control device and the second control device, and
    the communication method further comprises a step in which the third control device transmits the third data using a communication band that is not set in either the first communication band or the second communication band among the communication bands possessed by the network.

* * * * *